(12) United States Patent
Miyasaka et al.

(10) Patent No.: US 6,428,085 B1
(45) Date of Patent: Aug. 6, 2002

(54) BODY STRUCTURE IN FLOOR SECTION OF VEHICLE

(75) Inventors: Hiroyuki Miyasaka; Maki Sano, both of Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/654,497

(22) Filed: Sep. 1, 2000

(30) Foreign Application Priority Data

Sep. 2, 1999 (JP) .......................................... 11-249199
Sep. 28, 1999 (JP) .......................................... 11-275170

(51) Int. Cl.[7] .............................................. B62D 25/08
(52) U.S. Cl. ...................... 296/189; 296/204; 296/209
(58) Field of Search ................................ 296/209, 188, 296/189, 204, 203.03

(56) References Cited

U.S. PATENT DOCUMENTS

| 5,370,438 A | * | 12/1994 | Mori et al. ............. 296/209 X |
| 5,549,349 A | * | 8/1996 | Corporon et al. ....... 296/209 X |
| 5,613,727 A | | 3/1997 | Yamazaki |
| 5,671,968 A | * | 9/1997 | Masuda et al. ......... 296/209 X |
| 5,921,618 A | * | 7/1999 | Mori et al. ............. 296/209 X |
| 5,984,402 A | * | 11/1999 | Taeuchi .................. 296/208 X |
| 6,053,564 A | * | 4/2000 | Kamata et al. ......... 296/209 X |
| 6,234,568 B1 | * | 5/2001 | Aoki ....................... 296/209 X |

FOREIGN PATENT DOCUMENTS

| DE | 19538457 A1 | 4/1997 |
| EP | 0816520 A2 | 1/1998 |
| JP | 9-99870 | 4/1997 |

* cited by examiner

Primary Examiner—Joseph D. Pape
(74) Attorney, Agent, or Firm—McDermott, Will & Emery

(57) ABSTRACT

A vehicle body structure includes a floor structure 1. The floor structure 1 has a floor body 3 formed with generally-uniform sections in a vehicle's fore-and-aft direction, a dash cross member 11 connected with a front end of the floor body 3 and a rear cross member 13 connected with a rear end of the floor body 3. A side sill 5 is arranged on one side of the floor structure 1. A pillar 21 is connected with the side sill 5 through its lower end 21a. In the structure, a strength adjusting part 29 is formed in the side sill 5, for adjusting the strength of the side sill 5 in local. When the vehicle has a frank collision, the strength adjusting part 29 operates to reduce a collision reactive force generated on the side of the lower end 21a of the pillar 21 in comparison with the collision reactive force generated besides the lower end 21a of the pillar 21.

6 Claims, 25 Drawing Sheets

DISPLACEMENT OF PILLAR'S LOWER PART

DISPLACEMENT OF PILLAR'S LOWER PART

FRONT

REACTIVE FORCE CHARACTERISTICS OF FLOOR (STRENGTH)

REINFORCEMENT AREA

MOMENT GENERATED IN SILL $M_1$

PEAK

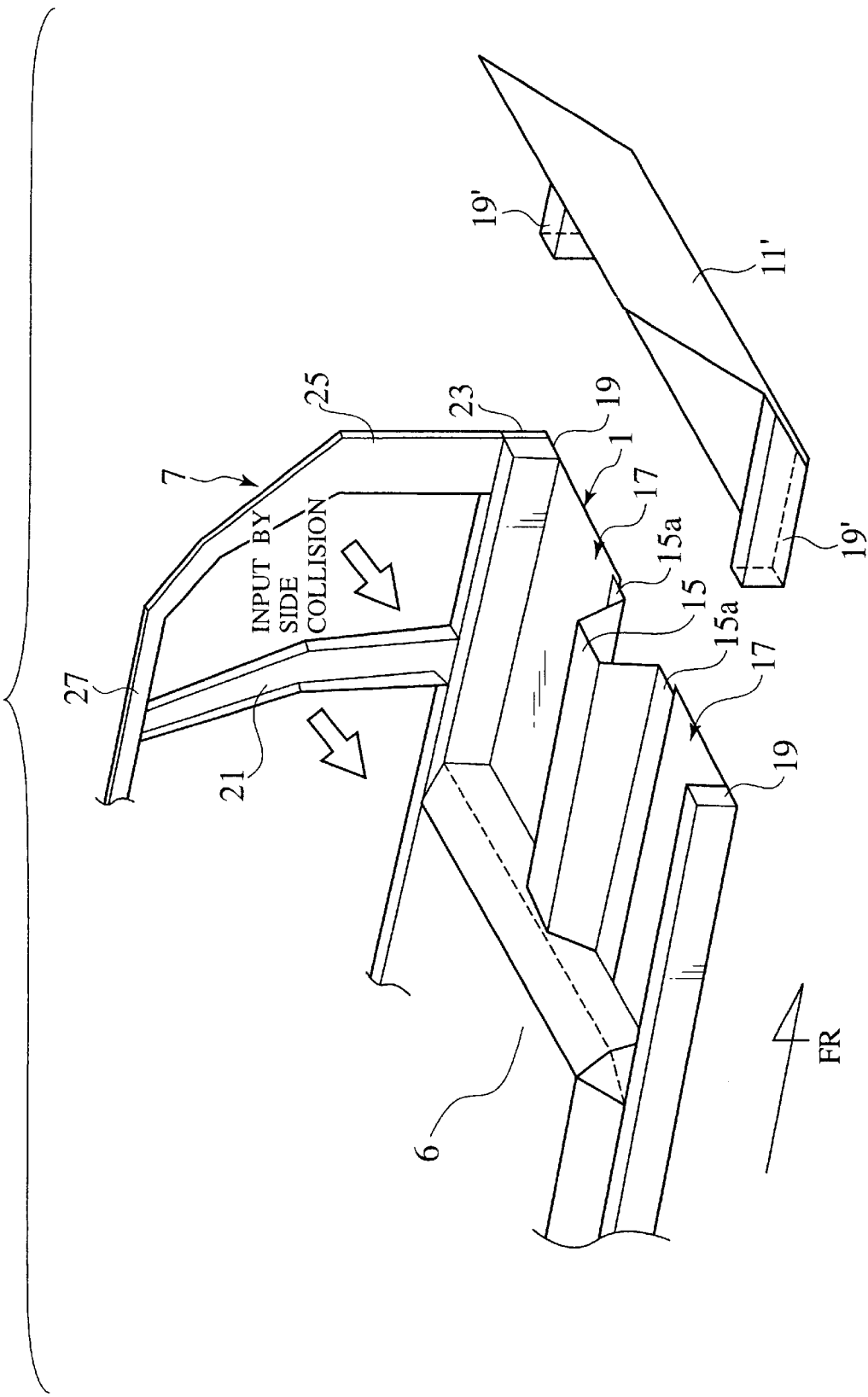

BODY STRUCTURE IN FLOOR SECTION OF VEHICLE

BACKGROUND OF THE INVENTION

1. Field of the Invention

The present invention relates to a body structure in a floor section of a vehicle.

2. Description of Related Art

A conventional body structure for an automotive floor section is disclosed in Japanese Patent Publication (kokai) No. 9-99870. In the body structure, a floor structure essential to the body structure is composed of one floor body and side sills on both sides of the floor body. The floor body is made from an extrusion of light metal, for example, aluminum alloy, manganese alloy, etc. The extrusion is obtained by extruding raw material of the above metal in a fore-and-aft direction of the vehicle.

According to the body structure equipped with the floor structure mentioned above, the number of components can be reduced to facilitate the assembling of the vehicle body and allow the resultant vehicle body to be light-weighted.

However, since the floor structure composed of the above-mentioned extrusion has a substantially uniform section in the vehicle's fore-and-aft direction, the strength (rigidity) distribution of the structure becomes uniform from its front end to the rear end. Therefore, when the floor structure is subjected to a load at the vehicle side collision, one side sill and the floor body are bent inward in a width direction of the vehicle.

Consequently, the apparent reactive force of the floor structure is so increased at the lower part of the center pillar that a great load may act on the center pillar or the like. Therefore, the center pillar has to be reinforced thoroughly, so that there is the possibility of increasing the weight of the body structure.

SUMMARY OF THE INVENTION

Under the above circumstance, it is an object of the present invention to provide a body structure which is capable of idealizing the deformation mode of the vehicle body in the vehicle side collision and which allows the body structure to be light-weighted furthermore.

According to the invention, the above-mentioned object is accomplished by a vehicle body structure for a vehicle, comprising:

- a floor structure having a floor body formed with generally-uniform sections in a vehicle's fore-and-aft direction, a dash cross member connected with a front end of the floor body to form a framework member of the floor structure and a rear cross member connected with a rear end of the floor body to form another framework member of the floor structure;
- a side sill arranged on one side of the floor structure;
- a pillar having its lower end connected to the side sill; and
- a strength adjusting part provided with at least either one of the side of the floor body and the side sill;
- wherein said strength adjusting part relatively reduces a collision reactive force generated on the side of a lower end of the pillar in a vehicle side collision in comparison with the collision reactive force generated besides the lower end of the pillar.

According to the invention, the above-mentioned object is also accomplished by a vehicle body structure for a vehicle, comprising:

a floor part made from an extruded member, wherein the floor part includes:
- a pillar area positioned so as to substantially accord with a center pillar arranged on one side of a vehicle body up and down, in a vehicle's fore-and-aft direction;
- an adjacent-pillar area arranged adjacently to the pillar area on the side of a center of the vehicle body in the vehicle's fore-and-aft direction, the adjacent-pillar area having a strength in a vehicle's width direction larger than the strength of the pillar area in the vehicle's width direction;
- a front area arranged in front of the adjacent-pillar area in the vehicle's fore-and-aft direction, the front area having a strength in a vehicle's width direction smaller than the strength of the adjacent-pillar area in the vehicle's width direction; and
- a rear area arranged behind the pillar area in the vehicle's fore-and-aft direction, the rear area having a strength in a vehicle's width direction smaller than the strength of the pillar area in the vehicle's width direction.

BRIEF DESCRIPTION OF THE DRAWINGS

FIG. 19 is a perspective view of the vehicle body structure in accordance with the sixth embodiment;

DESCRIPTION OF THE PREFERRED EMBODIMENT

1st. Embodiment

Figure 1:
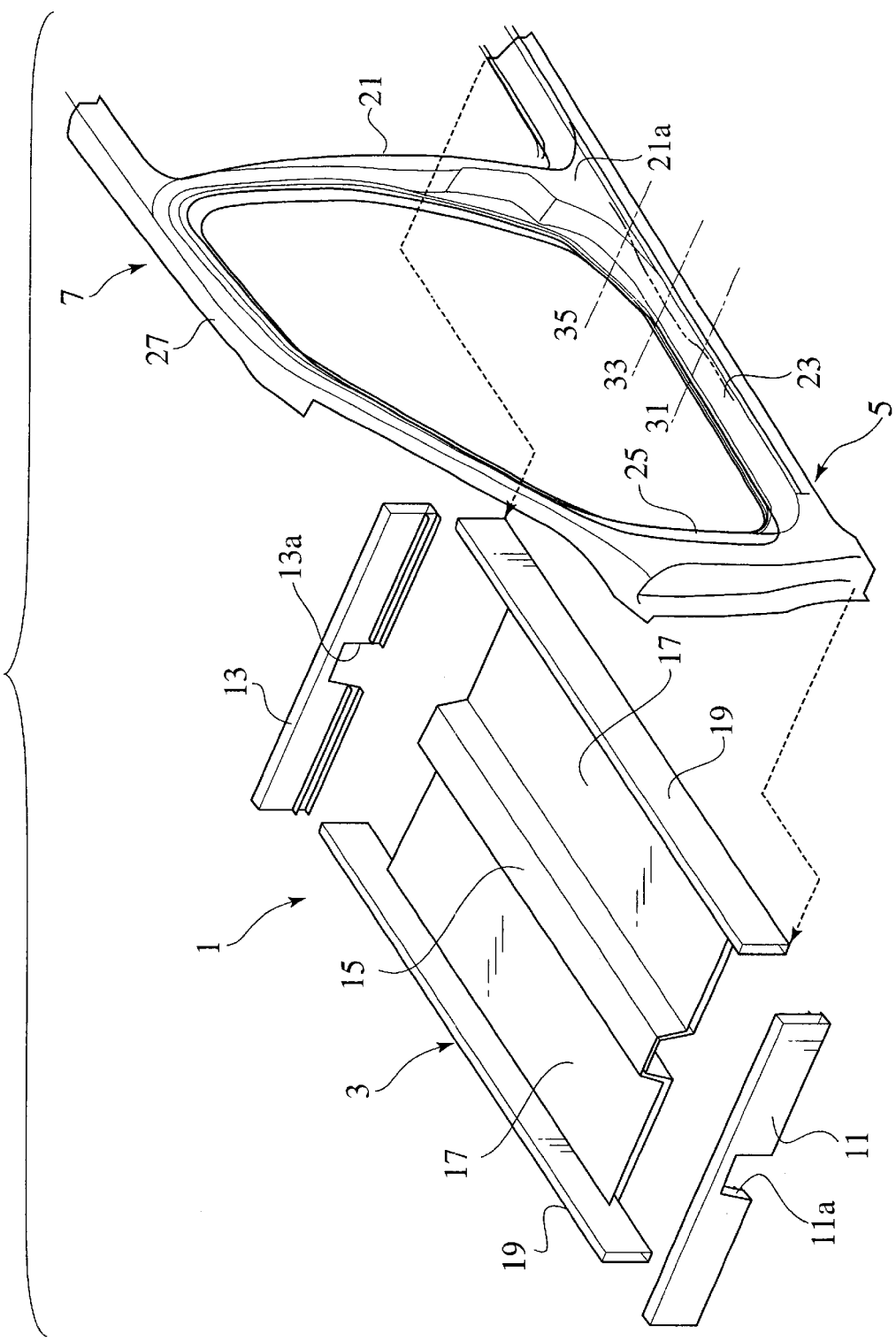
FIG. 1 is an overall exploded perspective view of a vehicle body structure in accordance with the first embodiment of the invention.
Figure 2:
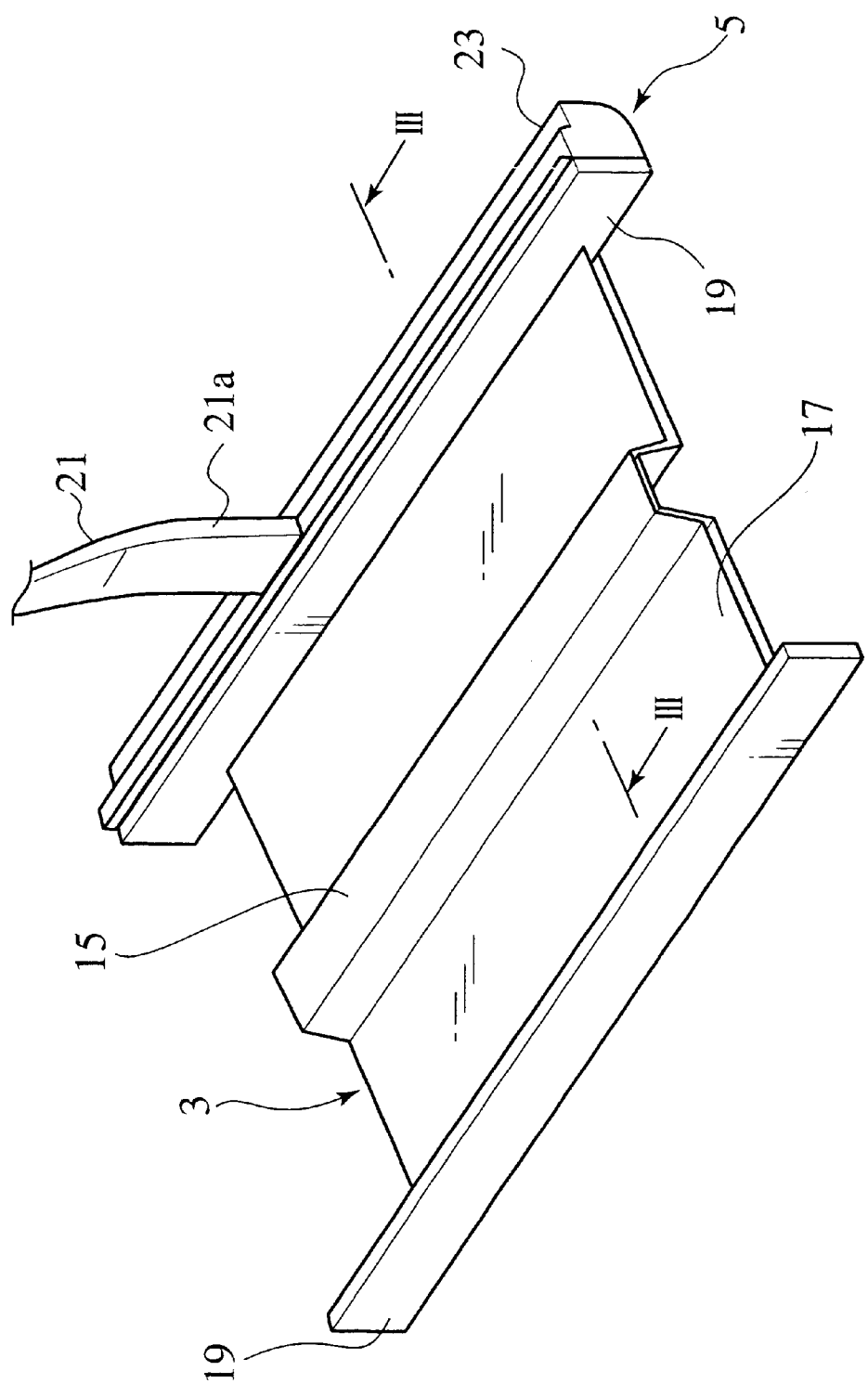
FIG. 2 is a partially-omitted perspective view of the vehicle body structure of the first embodiment, in its assembled condition.
Figure 3:
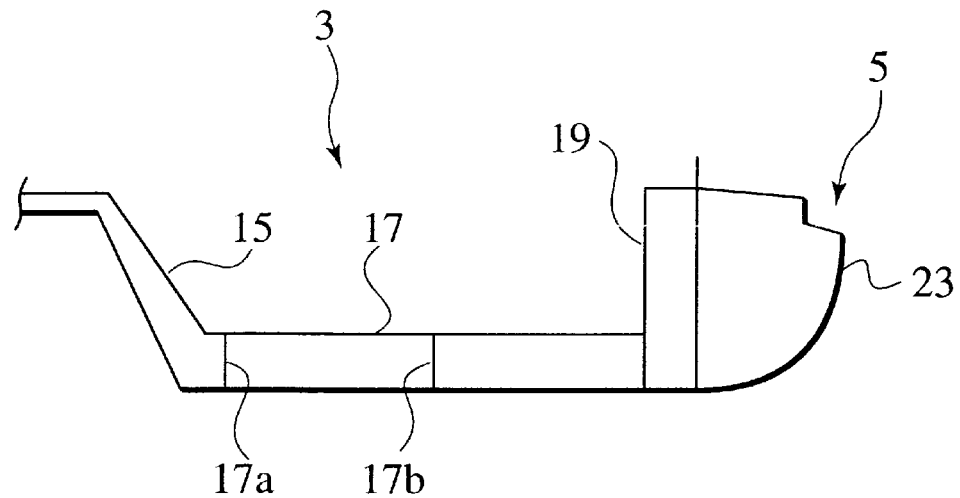
FIG. 3 is a sectional view taken along a line III—III of FIG. 2.
Figure 4:
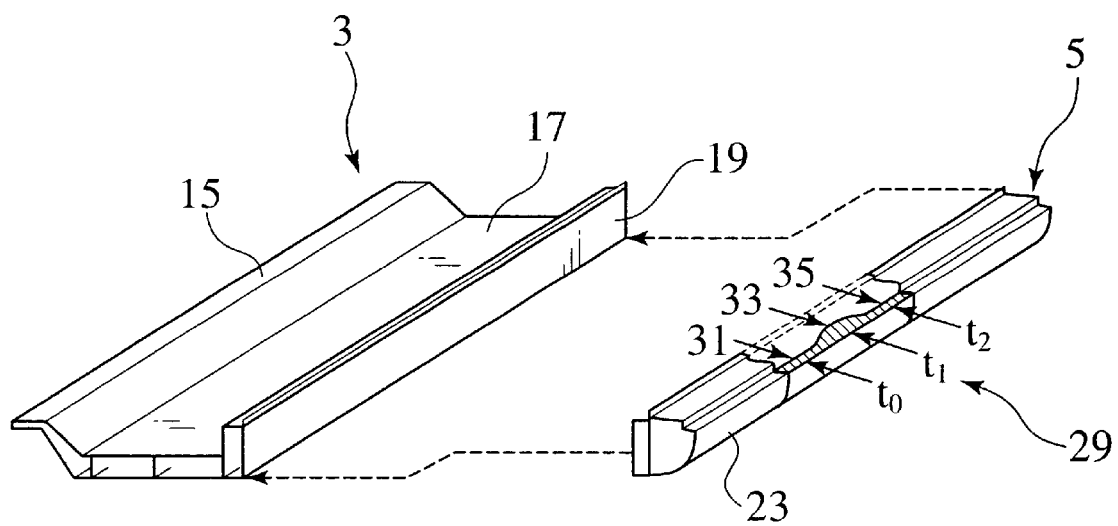
FIG. 4 is a notched perspective view of the essential part of the vehicle body structure of the first embodiment.

FIGS. 1 to 8 illustrate the first embodiment of the present invention. In these figures, FIG. 1 is an overall exploded perspective view of the vehicle body structure of the invention, FIG. 2 a partially-omitted perspective view of the vehicle body structure in the assembled condition, and FIG. 3 is a sectional view taken along a line III—III of FIG. 2. As shown in FIGS. 1 to 3, the vehicle body structure of the first embodiment comprises a floor.,structure 1 and a body side structure 7 arranged on each side of the floor structure 1.

The floor structure 1 includes a floor body 3, a dash cross member 11 and a rear cross member 13.

The floor body 3 is shaped so as to have a generally uniform cross section in the fore-and-aft direction of the vehicle. An extrusion made of light metal, for example, aluminum alloy, manganese alloy, etc. forms the floor body 3 of the floor structure 1. This extrusion is obtained by extruding the raw material of the light metal in the vehicle's fore-and-aft direction. Note that, in this specification, the vehicle's fore-and-aft direction may be often referred as "longitudinal direction".

The floor body 3 has a tunnel part 15 extending through the center of the body 3, a pair of floor parts 17 arranged on both sides of the tunnel part 15 and a pair of inner parts 19 each arranged on each side of the floor parts 17, all of which are integrally extruded to form the floor body 3. Note that each inner part 19 is also an element of a side sill 5 described. below. The tunnel part 15, the floor parts 17 and the inner parts 19 are provided in the form of hollow members, respectively. As shown in FIG. 3, the floor part 17 has partition walls 17a, 17b formed in the hollow body.

A dash cross member 11 is connected with a front end of the floor body 3 to form a framework member of the floor structure 1. Similarly, a rear cross member 13 is also connected with the rear end of the floor body 3, forming another framework member of the floor structure 1. In this embodiment, both of the dash cross member 11 and the rear cross member 13 are composed of extrusions of light metal, for example, aluminum alloy, manganese alloy, etc., which is similar to the floor member 3. These extrusions are together obtained by extruding the raw materials in a width direction of the vehicle. In opposition to the previously-defined longitudinal direction, the above width direction of the vehicle may be often referred as "latitudinal direction".

In the modification, the dash cross member 11 and the rear cross member 13 may be formed by castings of light metal or plate members thereof.

The dash cross member 11 has a recess 11a formed at its center in the vehicle's width direction (i.e. latitudinal center) to oppose the tunnel part 15 of the floor body 3. Similarly, the rear cross member 13 has a recess 13a formed at the latitudinal center to oppose the tunnel part 15. The dash cross member 11 is inserted between the front ends of the opposing inner parts 19 each forming the side sill 5. Then, the member 11 is secured to the inner parts 19, the tunnel part 15 and the floor parts 17 by means of welding or the like. Similarly, the rear cross member 13 is inserted between the rear ends of the opposing inner parts 19 and further secured to the inner parts 19, the tunnel part 15 and the floor parts 17 by the above means.

In this embodiment, the body side structure 7 is formed by a casting of light metal, for example, aluminum alloy, manganese ally, etc., provided with a center pillar 21. A lower end 21a of the center pillar 21 is integrated with an outer part 23 forming the side sill 5. A front end of the outer part 23 is joined to a lower end of a front pillar 25. The front pillar 25 is provided, on its upper end, with a roof side rail 27. In the body side structure 7, the outer part 23 of the side sill 5 is secured to the inner part 19 of the floor structure 1 by means of welding etc.

In the above-mentioned arrangement, the center pillar 21 is positioned so that it is offset rearward from a center of the floor body 3 in the vehicle's fore-and-aft direction. In accordance with the above definition in directions, the above center of the floor body 3 in the vehicle's fore-and-aft direction may be referred to as "longitudinal center" of the floor body 3.

The strength adjusting part 29 serves to relatively reduce a reactive force against a collision input, which force would be generated on the side of the lower end 21a of the center pillar 21 at the vehicle side collision, in comparison with a reactive force generated on the side of the longitudinal center of the floor body 3 under the same situation. The strength adjusting part 29 can be obtained by partially thickening the oute[00f8] part 23 of the side sill 5 composed of the casting of light metal. About the strength adjusting part 29, owing to the above formation, the strength is gradually increased from the lower end 21a of the center pillar 21 toward the longitudinal center of the floor body 3. In other words, it is carried out to increase the strength of the lower end 21a of the center pillar 21 in comparison with that of the longitudinal center of the floor body 3.

In detail, the side sill 5 is cast so that the outer part 23 has a thickness to at a general portion 31 and also a thickness $t_1$ at a position 33 corresponding to the above center of the floor body 3. Here, the latter thickness $t_1$ is larger than the former thickness $t_1$. Further, the outer part 23 is also contoured so as to gradually decrease its thickness from the above position 33 (thickness: $t_1$) toward a position 35 (thickness: $t_2$ ($t_0$)) just before the lower end 21A of the center pillar 21. Note that in this embodiment, the position 35 coincides with a position somewhat behind the sill's part where the lower end 21A of the center pillar 21 merges into the side sill 5.

Next, the operation of the above-constructed structure will be described below. First of all, we now describe the deforming phenomenon of the vehicle body providing that the body structure having the floor structure 1 connected to the dash cross member 11 and the rear cross member 13 is subjected to a lateral input in the vehicle side collision.

Figure 5:
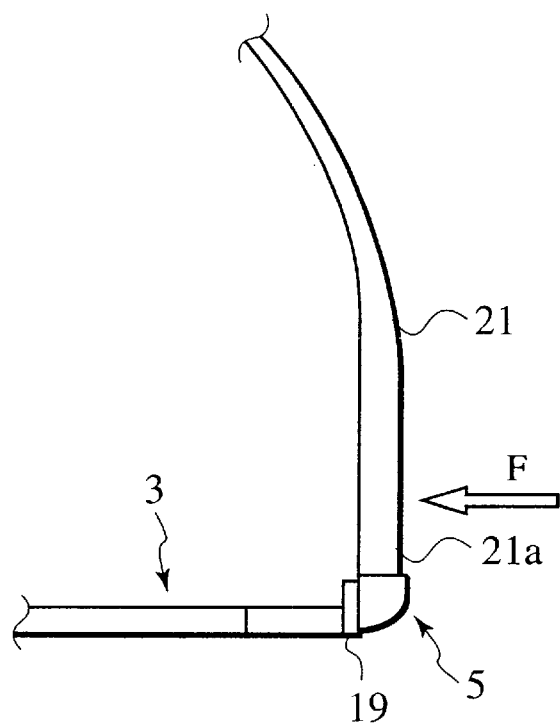
FIG. 5 is a schematic sectional view of the essential part, showing its situation before the vehicle side collision.
Figure 6:
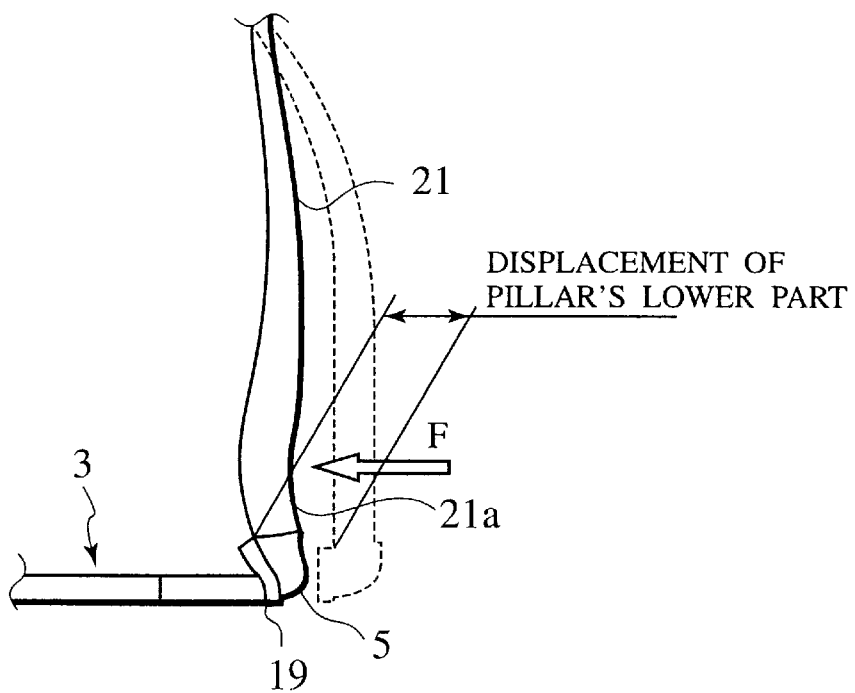
FIG. 6 is a schematic sectional view of the essential part, showing its situation after the vehicle side collision.

As shown in FIG. 5, if the input F is applied on the center pillar 21, then the lower part 21a of the center pillar 21 enters inward in the vehicle's width direction due to the deformation of the floor body 3, as shown in FIG. 6.

Figure 7A:
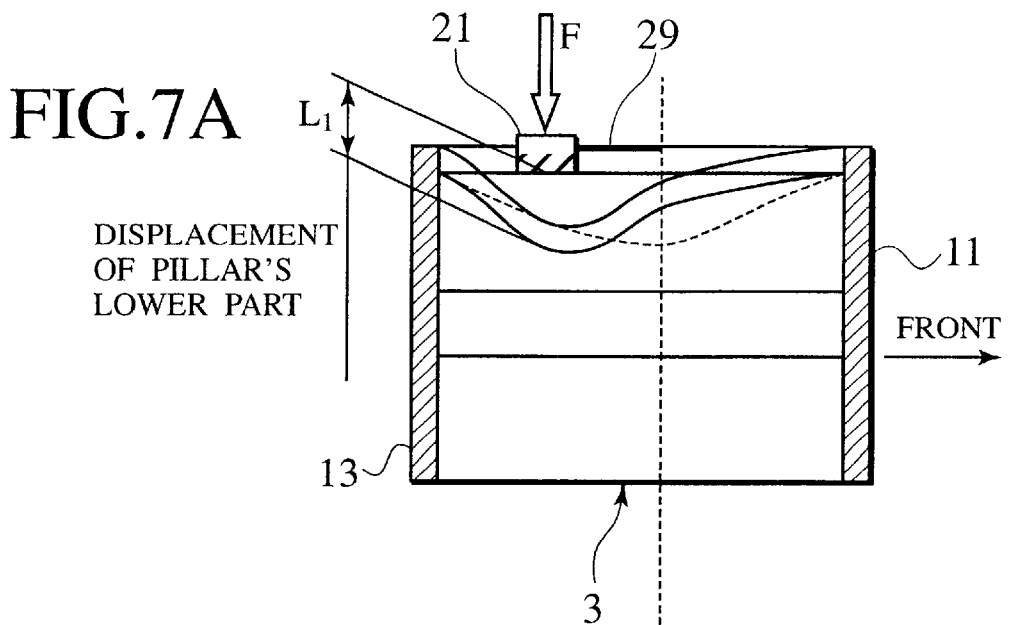
FIG. 7A is an explanatory diagram of an approaching amount (displacement) of a lower part of a pillar.
Figure 7B:
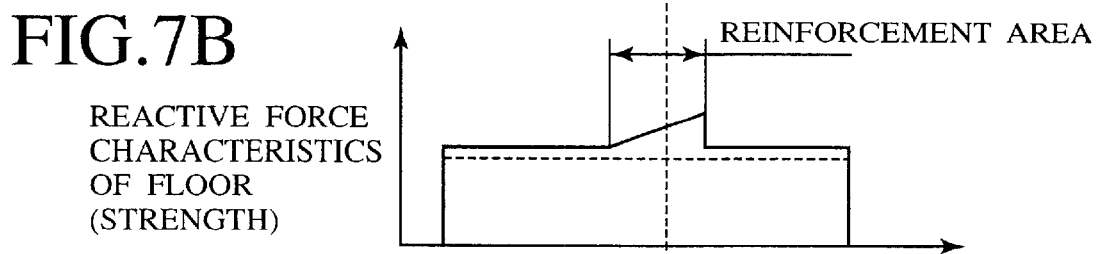
FIG. 7B an explanatory diagram of the character of reactive force of the floor.
Figure 7C:
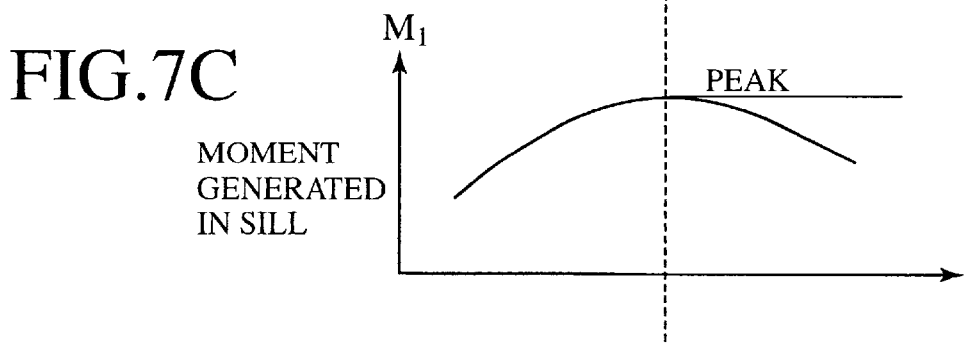
FIG. 7C is an explanatory diagram of the moment generated in the sill.

In detail, the side sill 5 is subjected to a bending moment $M_1$ shown in FIG. 7C. Thereafter, due to the bending deformation of the side sill 5, a buckling load will be applied on the floor body 3.

At that time, as shown in FIG. 7C, the bending moment $M_1$ generated in the side sill 5 takes a maximum value about the longitudinal center of the floor body 3, as shown in FIG. 7C. In an element having a substantially uniform section in the vehicle's fore-and-aft direction, for example, the floor body 3 of one extrusion, its "reactive force" characteristics determined by the side sill 5 and the floor body 3 will be constant as shown with a broken line of FIG. 7B. Consequently, under the action of the above-mentioned bending moment $M_1$, the above element will be deformed with a maximum displacement (approaching amount) $L_1$ about the longitudinal center of the floor body 3, as shown with a broken line of FIG. 7A.

We now describe the deformation of the center pillar 21 in the body side structure 7. As shown in FIG. 5, when the body side structure 7 is subjected to the lateral input (flank load) F, the lower end 21a of the center pillar 21 is bent while displacing in the vehicle's width direction, together with the deformation of the side sill 5 and the floor body 3 (see FIG. 6).

Figure 8:
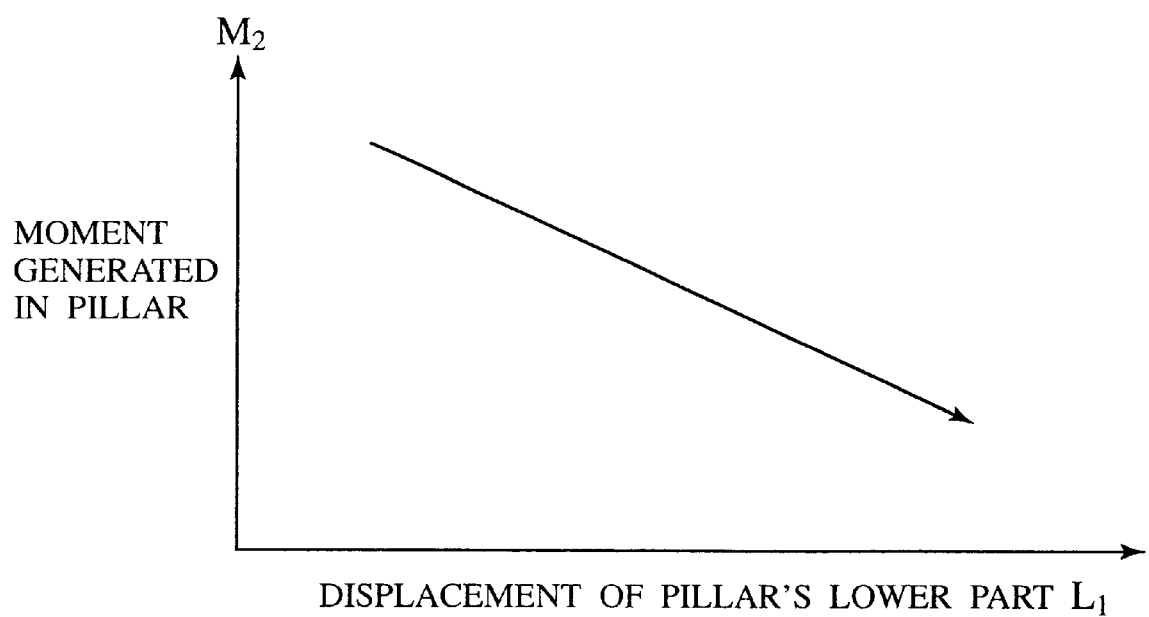
FIG. 8 is a graph of relationship between the moment generated in the pillar and the approaching amount of the lower part of the pillar.

FIG. 8 shows a relationship between the approaching amount $L_1$ of the end 21a of the center pillar 21 and the bending moment $M_2$ generated in the center pillar 21. That is, since the bending moment $M_2$ is in inverse proportion to the approach distance $L_1$ of the lower end 21a, it is necessary to make the approach distance $L_1$ larger in order to prevent the center pillar 21 from fracturing.

Nevertheless, the approach distance $L_1$ has to be less than a constant in view of ensuring a passenger's life space. It is advantageous in structure to equalize the approach distance $L_1$ of the center pillar 21 to the maximum approaching amount determined by the deformation of the side sill 5 and the floor body 3 while reducing the moment generated in the center pillar 21.

Based on the above-mentioned requirements, the side sill 5 of the first embodiment is provided, in the outer part 23, with the strength adjusting part 29 having a varied thickness. Therefore, it is possible to strengthen the floor body's part about the longitudinal center of the floor body 3, which generates the maximum bending moment $M_1$, owing to the plate thickness $t_1$. Further, it is also possible to cause the maximum deformation of the side sill 5 and the floor body 3 in the vicinity of the lower end 21a of the center pillar 21 because of a gradual change from the plate thickness $t_1$, to the plate thickness $t_2$. In other words, it is possible to attain the deformation $L_1$ of the side sill 5 and the floor body 3 without increasing the bending moment $M_2$ generated in the center pillar 21, thereby ensuring the passenger's life space in the vehicle cabin.

In this way, it is unnecessary to increase the thickness of the center pillar 21, thereby providing the lightweight body structure. Additionally, since the strength adjusting part 23 can be brought by the establishment in plate thickness of the outer part 23 of the side sill 5, there is no increase in the number of components. Owing to the formation of the; continuous strength distribution, it is possible to prevent the outer part 23 from being deformed in local, thereby accomplishing the energy absorption in a wide area.

2nd. Embodiment

Figure 9:
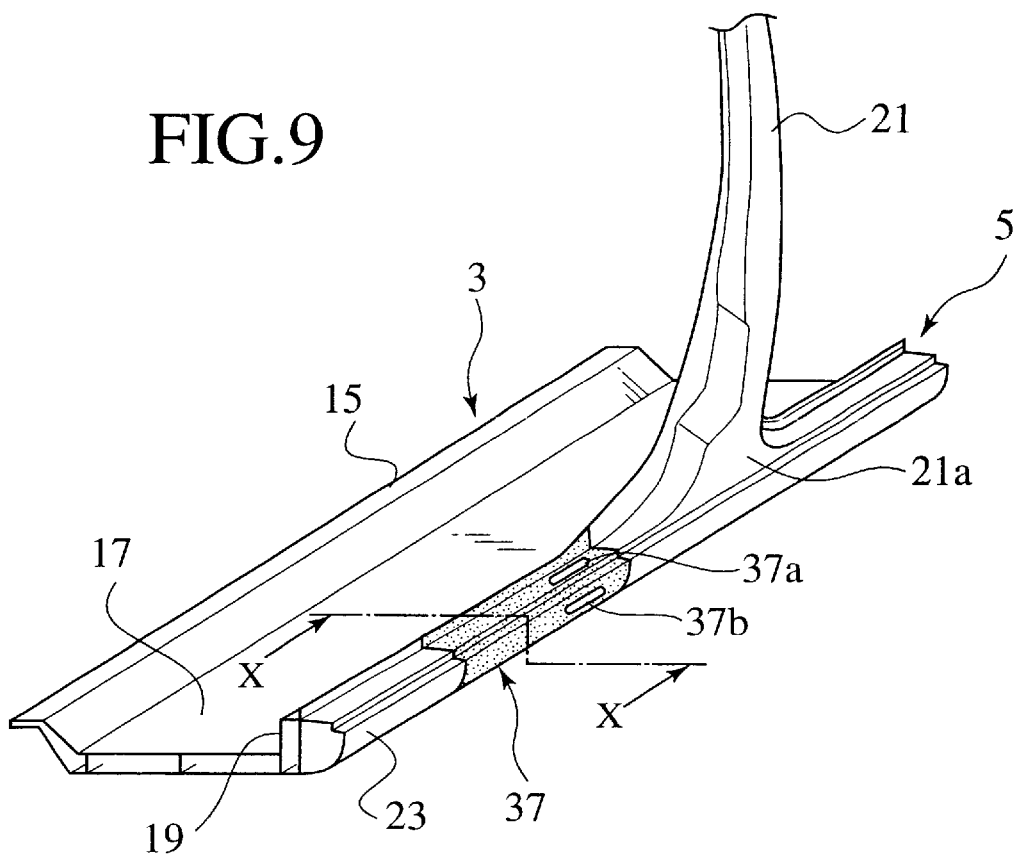
FIG. 9 is a perspective view of the essential part of the vehicle body structure of the second embodiment.
Figure 10:
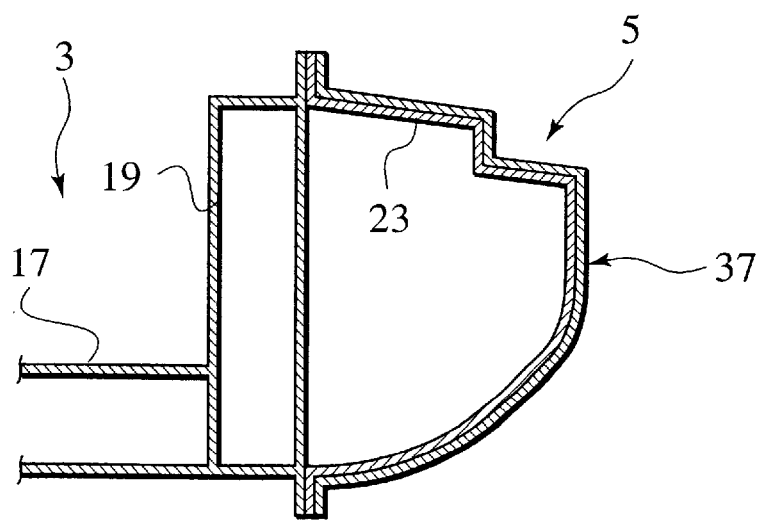
FIG. 10 is a sectional view taken along a line X—X of FIG. 9.

FIGS. 9 and 10 relate to the second embodiment of the invention. In the figures, FIG. 9 is a perspective view of an essential part of the structure and FIG. 10 is a sectional view taken along a line X—X of FIG. 9. In this embodiment, elements corresponding to those in the first embodiment are respectively indicated with the same reference numerals, respectively and their overlapping descriptions are eliminated.

According to the embodiment, as the above-mentioned strength adjusting part, a reinforcement plate 37 is arranged on the outer part 23 of the side sill 5. In order to increase the strength of the longitudinal center of the floor body 3 more than the strength of the lower end 21a of the center pillar 21, the reinforcement plate 37 has respective holes 37a, 37b formed in the vicinity of the rear end.

Consequently, it is possible to reduce the collision reactive force generated at the lower end 21a of the center pillar 21 in comparison with the collision reactive force generated on the central side of the floor body 3 in the vehicle's fore-and-aft direction, similarly to the first embodiment. Thus, the similar operations and effects to those of the first embodiment can be accomplished.

According to the embodiment, the reinforcement plate 37 can be fitted on deferred term to facilitate the establishment of the strength h adjusting part. Additionally, it is possible to form the outer part 23 of the side sill 5 and the center pillar 21 by castings or plate members of light metals.

Figure 11:
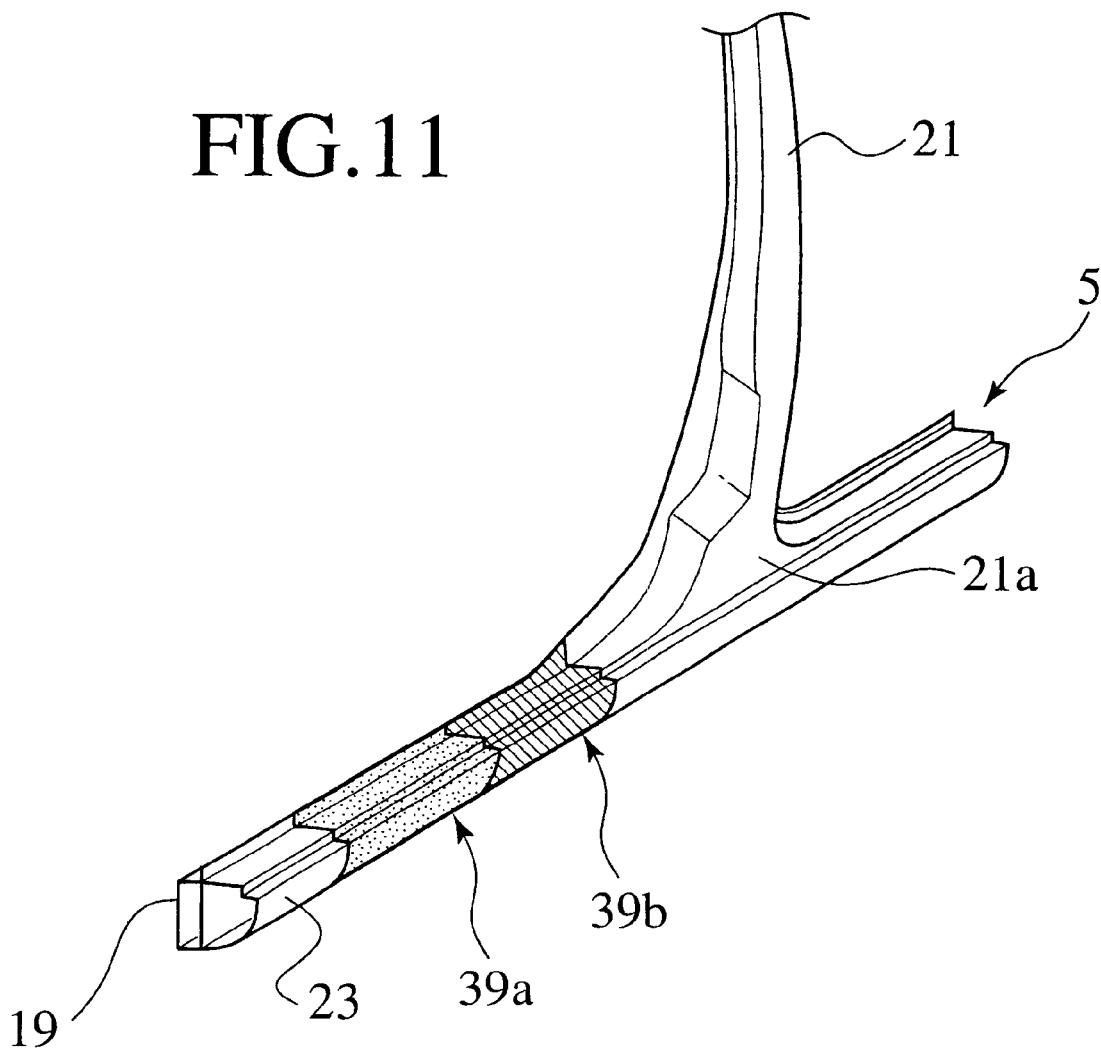
FIG. 11 is a perspective view of the essential part of the vehicle body structure in a modification of the second embodiment.

FIG. 11 shows one modification of the above-mentioned embodiment. According to the modification, a first reinforcement plate 39a and a second reinforcement plate 39b are provided in place of the above reinforcement plate 37. These plates 39a, 39b are arranged on the outer part 23 so as to extend from the central side of the floor body 3 in the vehicle's fore-and-aft direction to the just front of the lower part 21a of the center pillar 21. The second reinforcement plate 39b is formed with a thickness or strength smaller than that of the first reinforcement plate 39a.

Accordingly, it is possible to increase the strength of the central side of the floor body 3 in the vehicle's fore-and-aft direction in comparison with the strength of the lower end 21a of the center pillar 21, taking operations and effects similar to those of FIGS. 9 and 10.

In FIG. 11, it is possible to increase the strength of the outer part 23 over the whole periphery under the identical condition. Thus, when the vehicle is subjected to the flank load, the outer part 23 of the side sill 5 can be deformed in the vicinity of the lower part 21a of the center pillar 21, as the starting point (i.e. a maximum deforming point of the side sill 5 and the floor body 3).

3rd. Embodiment

Figure 12:
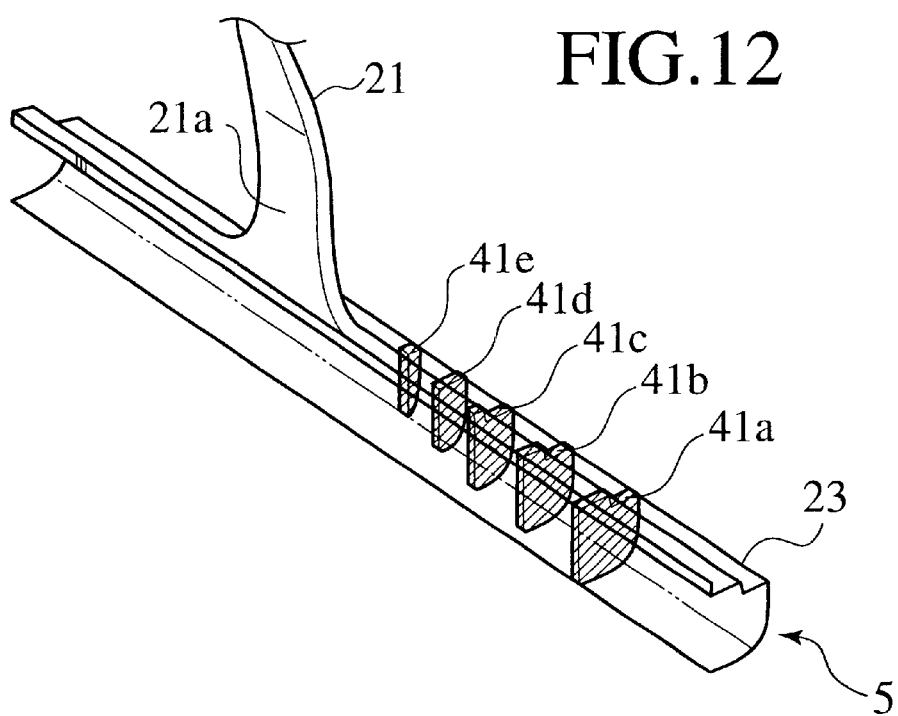
FIG. 12 is a perspective view of the essential part of the vehicle body structure of the third embodiment.

FIG. 12 is a sectional view of an essential part of the third embodiment. In the shown structure, elements corresponding to those in the above mentioned embodiment are respectively indicated with the same reference numerals and furthermore, overlapping descriptions in these embodiments are eliminated.

According to the embodiment, the outer part 23 of the side sill 5 is made from plate materials. Further, respective ribs (or bulkheads) 41a, 41b, 41c and 41d are arranged inside the outer part 23 at regular intervals, providing the strength adjusting part of the invention.

In detail, the ribs 41a, 41b, 41c and 41d are respectively arranged in the outer part 23 at intervals from the central side of the floor body 3 in the vehicle's fore-and-aft direction to the just front of the lower part 21a of the center pillar 21. These ribs 41a, 41b, 41c and 41d are made from castings or plates of light alloy metals and also formed so as to have their height or thickness gradually decreased from the front rib 41a toward the rear rib 41e. Therefore, also in this embodiment, operations and effects generally similar to those of the first embodiment can be taken.

Furthermore, it is also possible to prevent the outer part 23 of the side sill from being buckled, whereby the reinforcing effect tan be enhanced.

Note, the reinforcing effect of the ribs 41a, 41b, 41c and 41d can be controlled by not only their setting of height or thickness but also an increase or decrease in the number of ribs. Thus, to adjust at least one of these parameters (height, thickness, number, shape, and position) in this embodiment can provide the strength adjusting part of the invention. Additionally, owing to such the adjustment, it is possible to establish the strength adjusting part appropriately.

Figure 13:
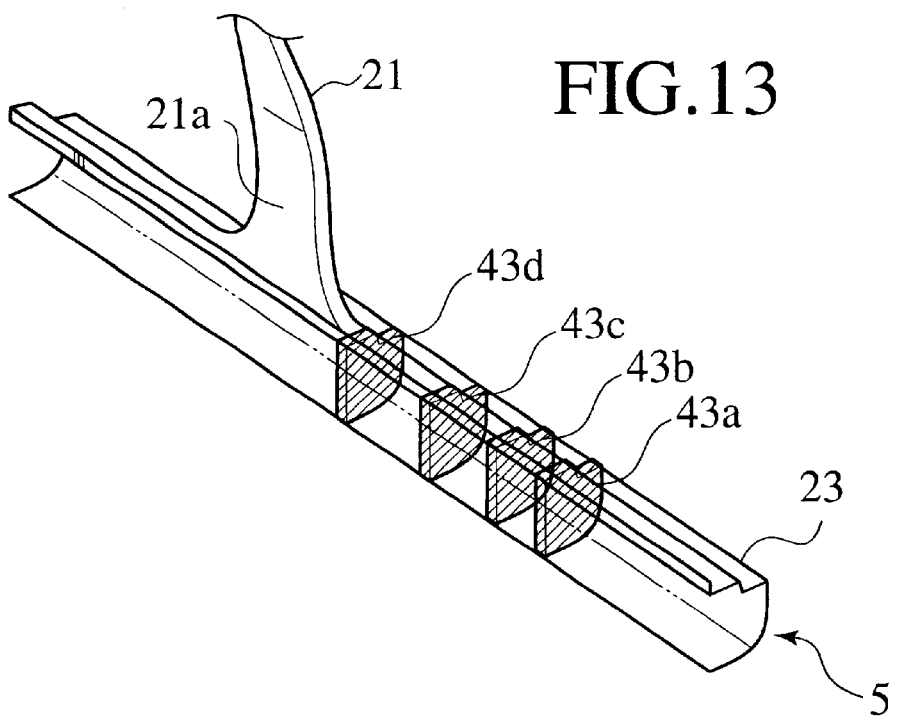
FIG. 13 is a perspective view of the essential part of the vehicle body structure in a modification of the third embodiment.

FIG. 13 shows a modification of the above-mentioned embodiment. According to the modification, the ribs 43a, 43b, 43c and 43d are all identical in both shape and thickness shape. While, the ribs :43a, 43b, 43c and 43d are arranged so that an interval between the neighboring ribs gradually increases from the central side of the floor body 3 in the vehicle's fore-and-aft direction to the just front of the lower part 21a of the center pillar 21.

Therefore, also in this modification, it is possible to take operations and effects generally similar to those of the above-mentioned embodiment. Further, it is possible to control the buckling mode in the outer part 23 of the side sill 5 in further detail, with ease. Additionally, the adjustments in reinforcing effect and/or collision reactive force at the outer part 23 can be completed by adjusting at least one of the above parameters (height, thickness, number, shape, position) of the ribs 43a, 43b, 43c and 43d appropriately.

4th. Embodiment

Figure 14:
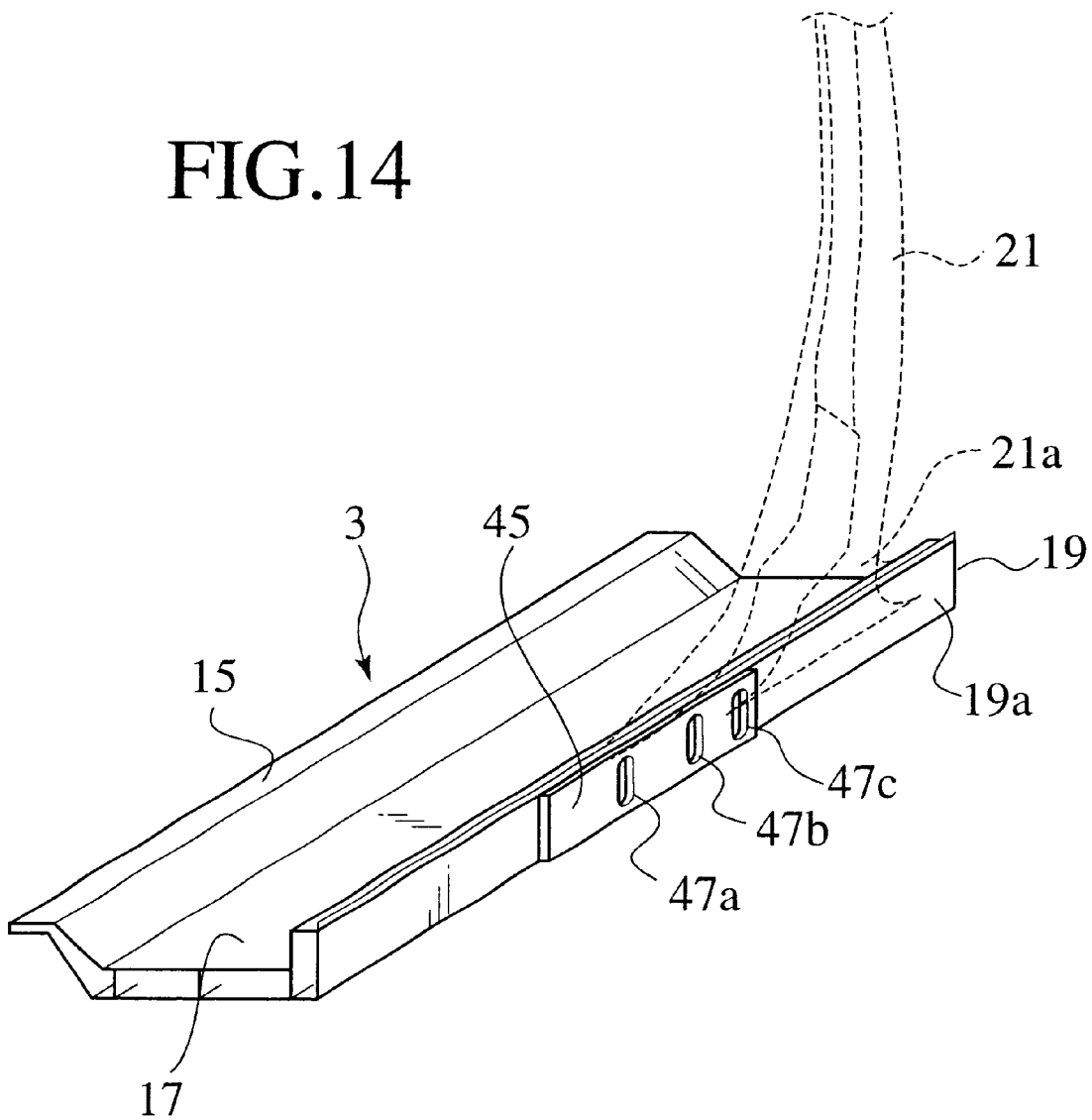
FIG. 14 is a perspective view of the essential part of the vehicle body structure of the fourth embodiment.

FIG. 14 is a perspective view of an essential part of the fourth embodiment. Note that, in this embodiment, elements corresponding to those of the first embodiment are indicated with the same reference numerals respectively and therefore, their overlapping descriptions are eliminated.

According to the embodiment, a reinforcement member 45 is attached to an outside wall 19a of the inner part 19 of the side sill 5, providing the strength adjusting part. That is, the reinforcement member 45 is arranged on each side of the floor body 3 in the vehicle's width direction.

Again, the reinforcement member 45 is in the form of a plate provided with grooves 47a, 47b and 47c formed therein. These grooves 47a, 47b and 47c are arranged so as to narrow intervals defined between the neighboring grooves gradually as they approach to the rear. Accordingly, it is possible to increase the strength of the central side of the floor body 3 in the vehicle's fore-and-aft direction in comparison with the strength of the lower end 21a of the center pillar 21, taking operations and effects similar to those of the first embodiment.

Additionally, the structure of this embodiment would be applicable to the side sill 5 even if the outer part 23 of the side sill 5 cannot be reinforced.

Figure 15:
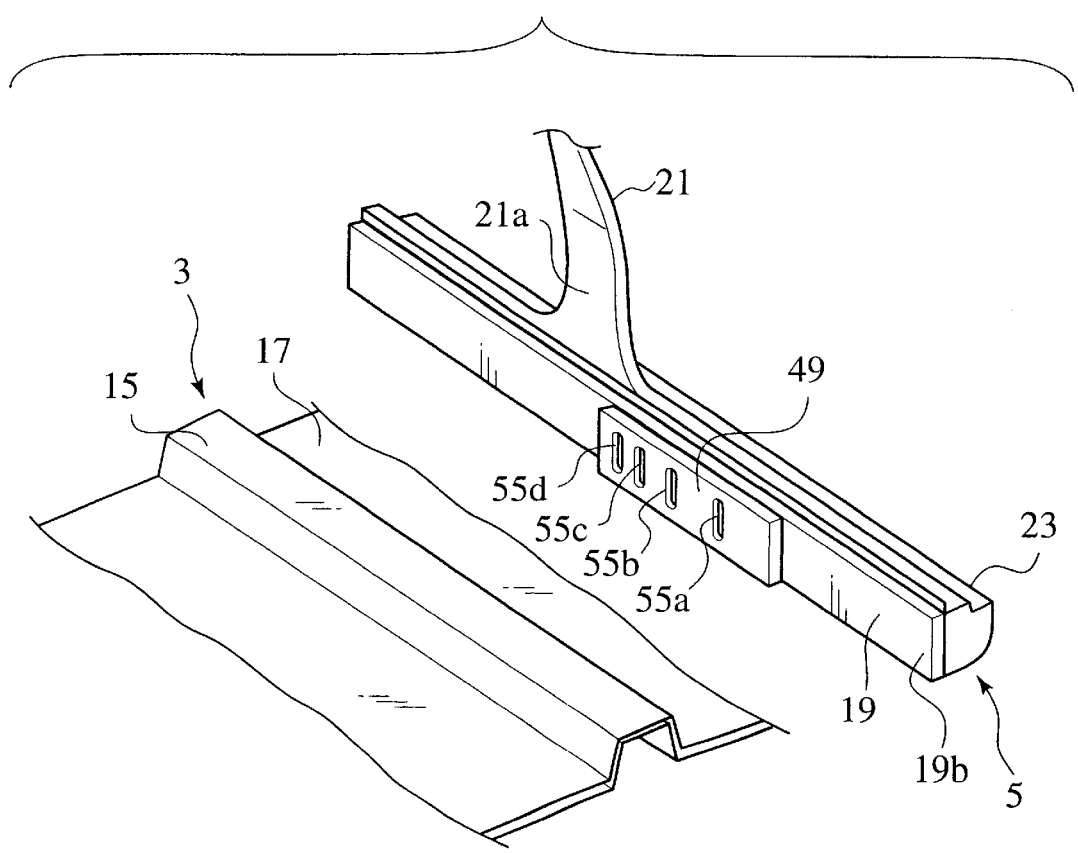
FIG. 15 is a perspective view of the essential part of the vehicle body structure in a modification of the fourth embodiment.
Figure 16:
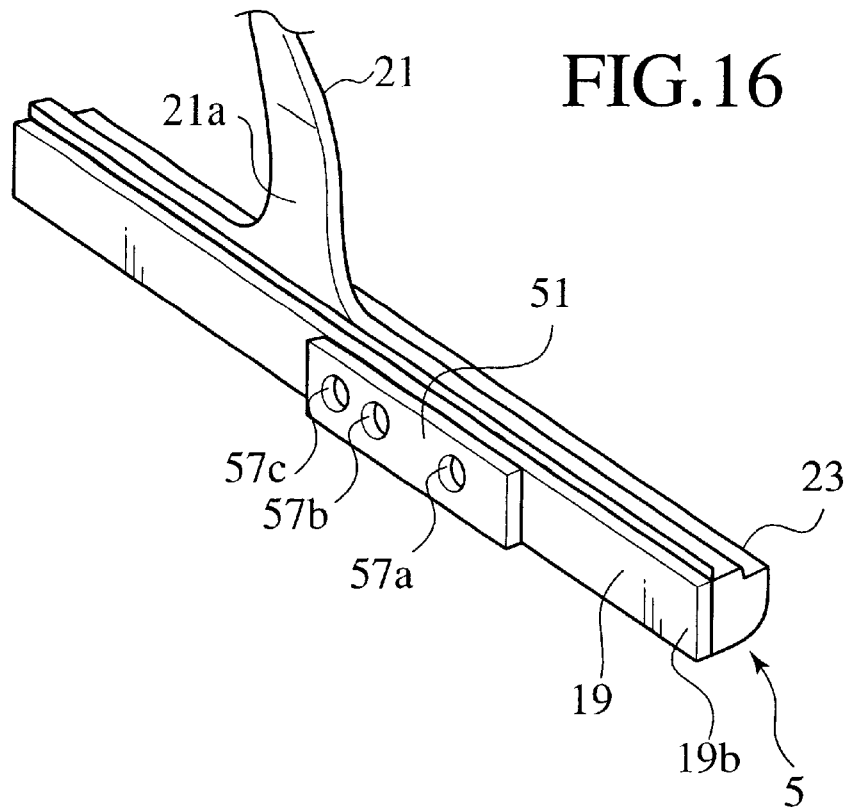
FIG. 16 is a perspective view of the essential part of the vehicle body structure in another modification of the fourth embodiment.
Figure 17:
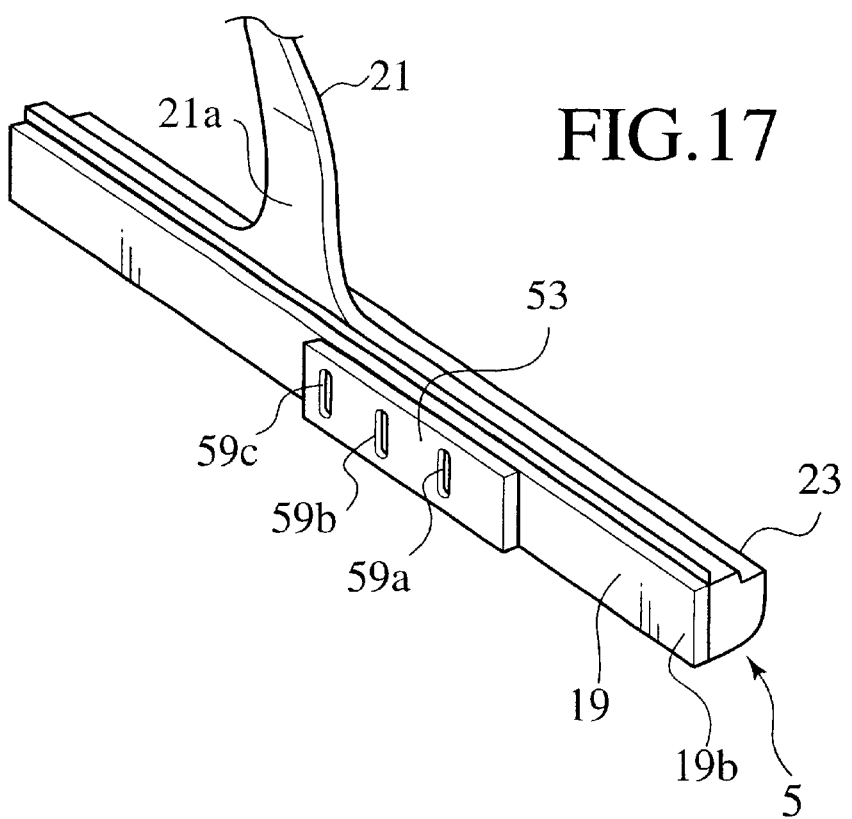
FIG. 17 is a perspective view of the essential part of the vehicle body structure in the other modification of the fourth embodiment.

FIGS. 15, 16 and 17 shows respective modifications of the above-mentioned embodiments, in which reinforcement members 49, 51, 53 are attached to the inside wall 19a of the inner part 19 of the side sill 5, respectively. These reinforcement members 49, 51, 53 are arranged so as to extend from the general central of the floor body 3 in the vehicle's fore-and-aft direction to the just front of the lower end 21a of the center pillar 21. The reinforcement member 49 is provided with beads 55a, 55b, 55c and 55d. The reinforcement member 51 is provided with holes 57a, 57b and 57c. The reinforcement member 53 is provided with grooves 59a, 59b and 59c.

The above beads 55a, 55b, 55, 55d of the member 49, the holes 57a, 57b, 57c of the member 51 and the grooves 59a, 59b, 59c of the member 53 are respectively arranged so as to gradually narrow intervals defined therebetween as approaching to the rear.

Owing to the provision of the reinforcement members 49, 51, 53 (FIGS. 15, 16, 17), when the strength of the central side of the floor body 3 in the vehicle's fore-and-aft direction is increased in comparison with the strength of the lower end 21a of the center pillar 21, it is possible to adjust the structure's reactive force against the collision. Therefore, the similar operations and effects to those of FIG. 14 can be taken in the modifications of FIGS. 15, 16, and 17.

Additionally, the structures in accordance with the modifications of FIGS. 15, 16, 17 would be applicable to the side sill 5 even if it is impossible to reinforce the outer part 23 of the side sill 5 or the outside wall 19a of the inner part 19.

5th. Embodiment

Figure 18A:
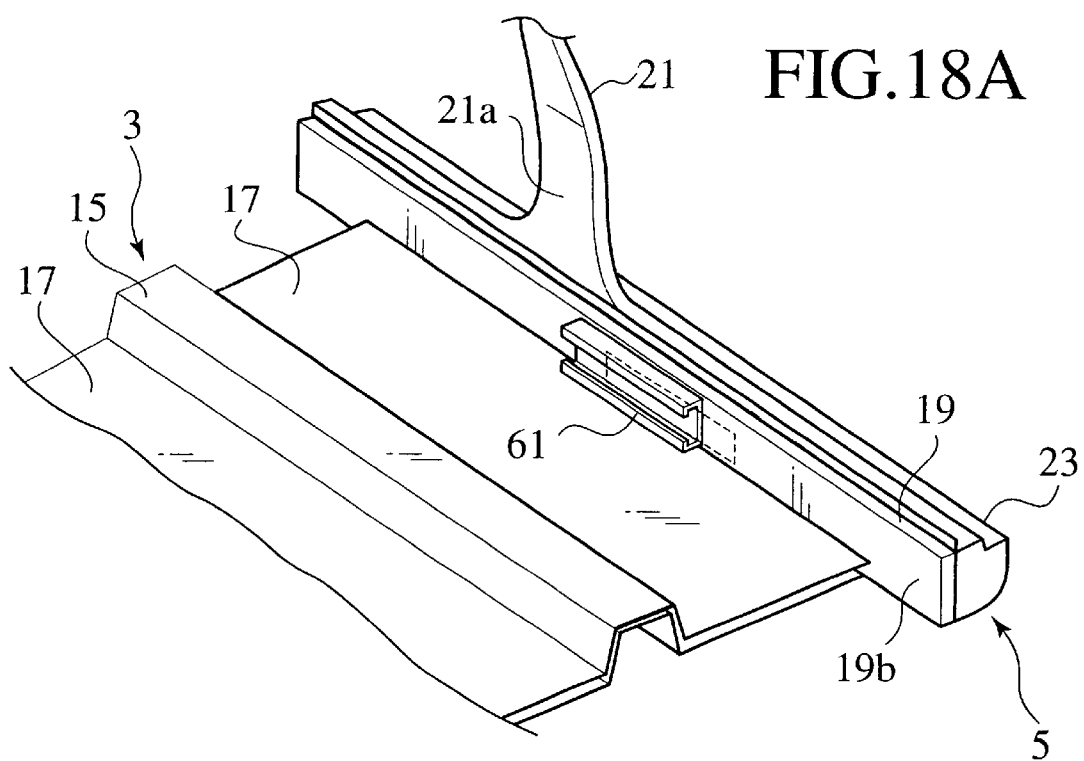
FIG. 18A is a perspective view showing the arrangement of a strength adjusting part of the vehicle body structure of the fifth embodiment.
Figure 18B:
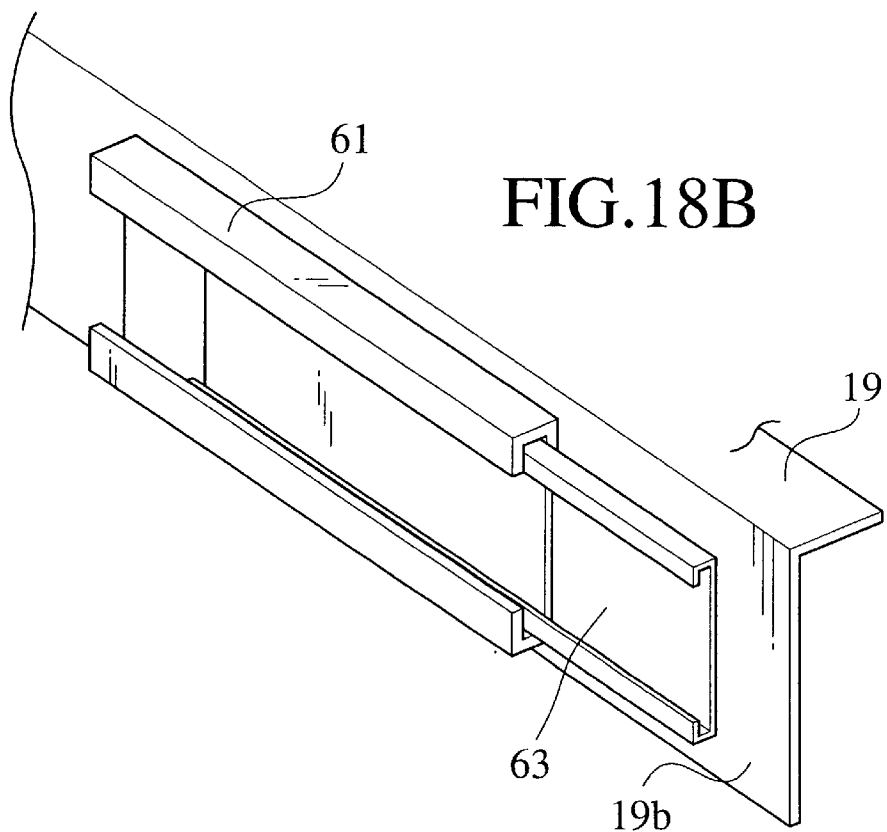
FIG. 18B is an enlarged perspective view of the essential part of the vehicle body of the fifth embodiment.

FIG. 18A is an overall perspective view of the vehicle body structure of the fifth embodiment. FIG. 18B is a perspective view of an essential part of the vehicle body of the embodiment. Also in this embodiment, elements corresponding to those of the first embodiment are indicated with the same reference numerals respectively and therefore, their overlapping descriptions are eliminated.

In the embodiment, a seat attachment member 61 is attached on the inside wall 19b of the inner part 19 of the side sill 5, as a component attachment member. The attachment member 61 is arranged so as to extend from the longitudinal center of the floor body 3 to the just front of the lower end 21a of the center pillar 21.

The seat attachment member 61 is made from an extrusion of light metal, a casting or a plate material of the same metal. The member 61 has a cross section in the form of a channel. A rail member 63 on the side of a not-shown seat is carried so as to be slidable in the member 61, as shown in FIG. 18B.

As shown in this figure, the seat attachment member 61 is adapted so as to engage with the rail member 63 except the rear portion of the member 61. With this engagement form, it is possible to increase the strength of the longitudinal center of the floor body 3 more than that of the lower end 21a of the center pillar 21, which is equivalent to the provision of the strength adjusting part. Thus, the reactive force against the vehicle's collision can be adjusted thereby performing the operations and effects similar to those of the first embodiment.

Additionally, the present form of the strength adjusting part allows another component to be attached to the floor side of the vehicle. Although the reactive force against the vehicle's collision is adjusted by increasing the strength of the longitudinal center of the. floor body 3 more than that of the lower end 21a of the center pillar 21 in; the above-mentioned embodiments, the reactive force against the vehicle's collision may be adjusted by decreasing the strength of the lower end 21a of the center pillar 21 in comparison with that of the longitudinal center of the floor body 3. Also in this case, it would be possible to perform the operations and effects similar to those of the first embodiment.

6th. Embodiment

Figure 20:
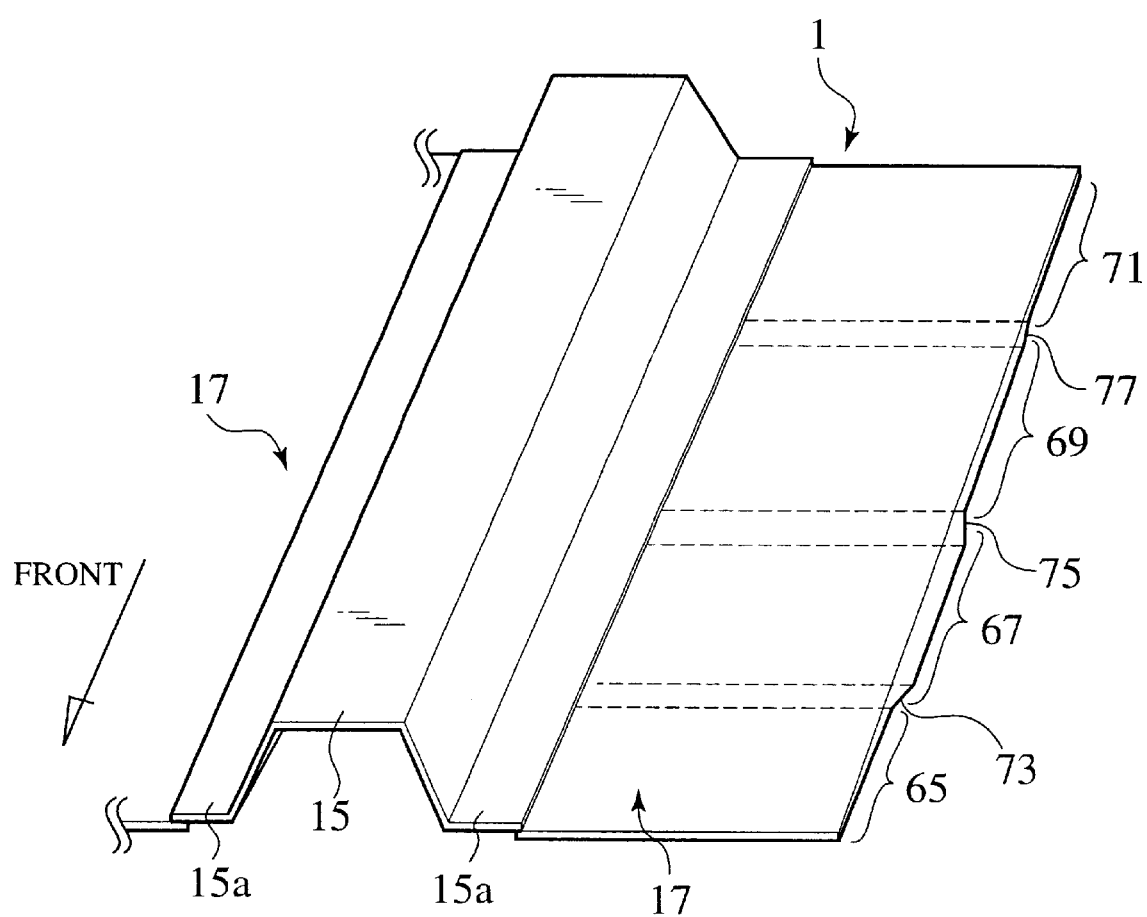
FIG. 20 is a perspective view of the essential part of the vehicle body structure in accordance with the sixth embodiment.

FIGS. 19 and 20 show the sixth embodiment of the invention. FIG. 19 is an overall perspective view and FIG. 20 is a perspective view of the essential part of the vehicle body structure. Also in this embodiment, elements corresponding to those of the first embodiment are indicated with the same reference numerals, respectively. As shown in the figures, the floor structure 1 of the embodiment has its front end joined to a dash lower member 11' of a not-shown dash board and the rear end joined to a rear floor 6. The inner parts 19 of the side sills 5 are secured on both sides of the floor structure 1 in the vehicle's width direction. The outer part 23 of the body side structure 11 is joined to each inner part 19 of the side sill 5. The body side structure 11 further includes the front pillar 25, the center pillar 21, the roof side rail 27, etc.

The floor structure 1 has the tunnel part (section) 15 arranged at the vehicle's center in the width direction and the floor parts (sections) 17 arranged on both sides of the tunnel part 15. The tunnel section 21 and the floor sections 17 are respectively made from extrusions of light metals, for example, aluminum alloy, manganese alloy or the like.

The extruding direction to form the tunnel section 21 is identical to the vehicle's fore-and-aft direction. While, the extruding direction to form the floor sections 17 is identical to the vehicle's width direction. The structure of the left and right floor sections 17 are identical with each other and therefore, we now describe the structure of the left floor section 17 representatively.

The floor section 17 is shaped in the form of a plate and comprises a front area 65, a pillar-adjacent area 67, a pillar area 69 and a rear area 71. In the embodiment, the front area 65, the pillar-adjacent area 67, the pillar area 69 nd the rear area 71 are adjacently arranged one after another, from the vehicle's front in the fore-and-aft direction.

The above pillar area 69 is positioned so as to correspond to the center pillar 21 in the vehicle's fore-and-aft direction. The pillar-adjacent area 67 is adjacent to the pillar area 69 and also positioned on the side of the longitudinal center of the floor section 17. Although the pillar-adjacent area 67 of the embodiment is established so as to involve the longitudinal center of the floor section 17, the same area 67 is strictly shifted from the longitudinal center of the floor section 17 somewhat forward. Further, it is established that the pillar-adjacent area 67 has a strength larger than that of the pillar area 69. In other words, at the vehicle side collision, the reactive force of the pillar-adjacent area 67 in the vehicle's width direction is established larger than the reactive force of the pillar area 69.

In the vehicle's fore-and-aft direction, the front area 65 is arranged in front of the pillar-adjacent area 67 adjacently. On the other hand, in the same direction, the rear area 71 is arranged behind the pillar area 69 adjacently. Further, it is established that the front area 65 has a strength smaller than that of the pillar-adjacent area 67 and similarly, the rear area 71 has a strength smaller than that of the pillar area 69. Accordingly, it is established that, at the vehicle side collision, the respective reactive forces of the front area 65 and the rear area 71 in the vehicle's width direction become smaller than those of the pillar-adjacent area 67 and the pillar area 69, respectively. In the embodiment, the front area 65 is established to have a strength substantially equal to that of the rear area 71. Besides, the front area 65 may be established to have a strength smaller than that of the rear area 71 in the modification.

Altering the thickness of these areas in this embodiment attains the establishment in strength of the front area 65, the pillar-adjacent area 67, the pillar area 69 and the rear area 71. Thus, it is established to form the pillar adjacent area 67 with the largest thickness and the pillar area 69 with the second largest thickness. The front area 65 and the rear area 71 are formed thinner than the pillar-adjacent area 67 and the pillar area 69. Further, the front area 65 is formed so as to get thinner toward the front side of the vehicle gradually and also established so that the area's thickness at the front side is smaller than the thickness of the rear area 71. Besides, the average thickness lo of the front area 65 is similar to that of the rear area 71.

Defined between the front area 65 and the pillar-adjacent area 67, between the pillar-adjacent area 67 and the pillar area 69, and between the pillar area 69 and the rear area 71 are respective slanted surfaces 73, 73 and 77 which prevent the cross section of the floor section 17 from abruptly changing thereby to avoid the stress concentration. The latitudinal inner side of the floor section 17 is secured to the under face of the flange part 15a of the tunnel section 15 by means of laser welding etc.

Figure 21:
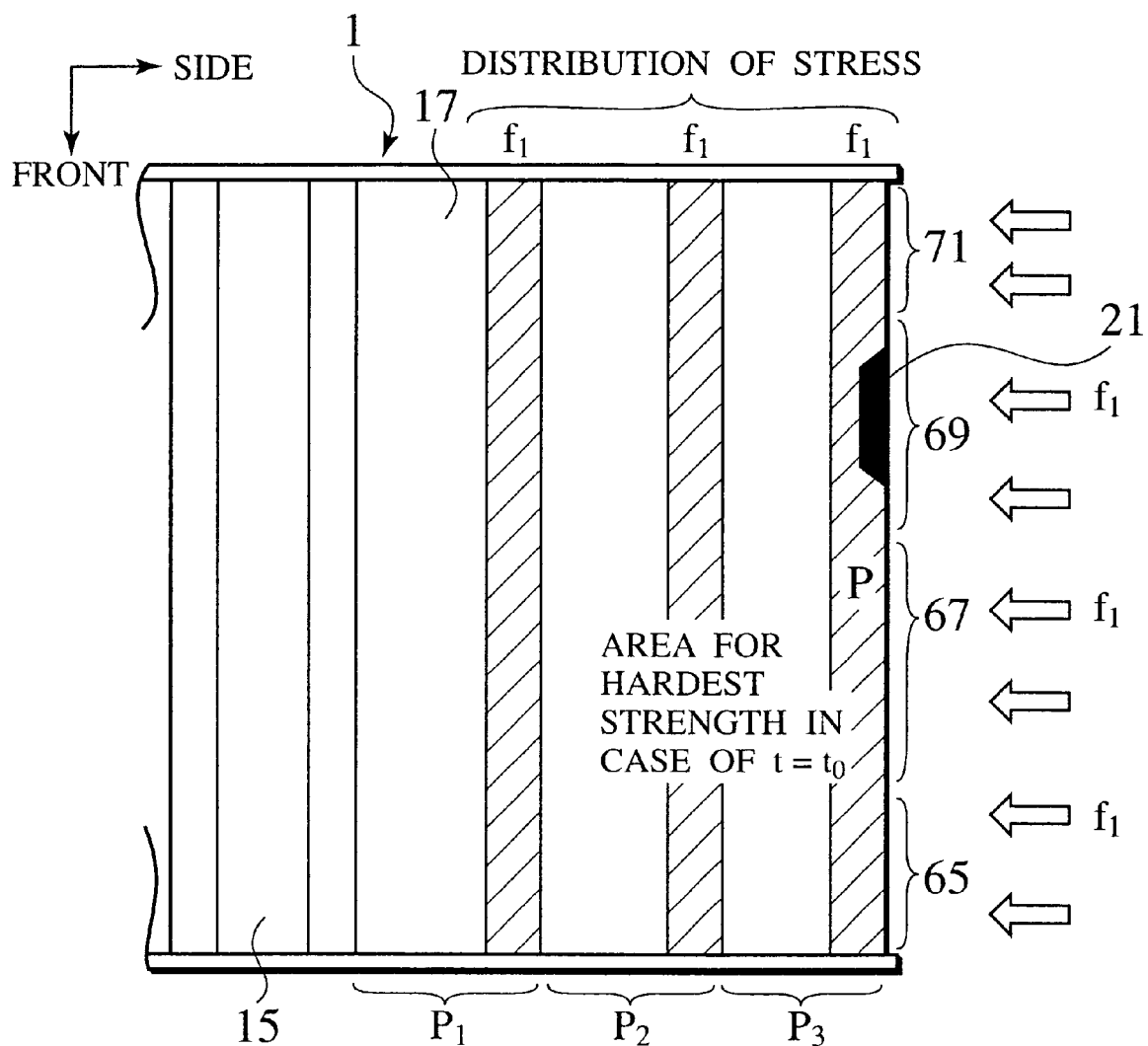
FIG. 21 is a plan view of the essential part of a floor, showing its stress state at the beginning of the vehicle side collision.
Figure 22:
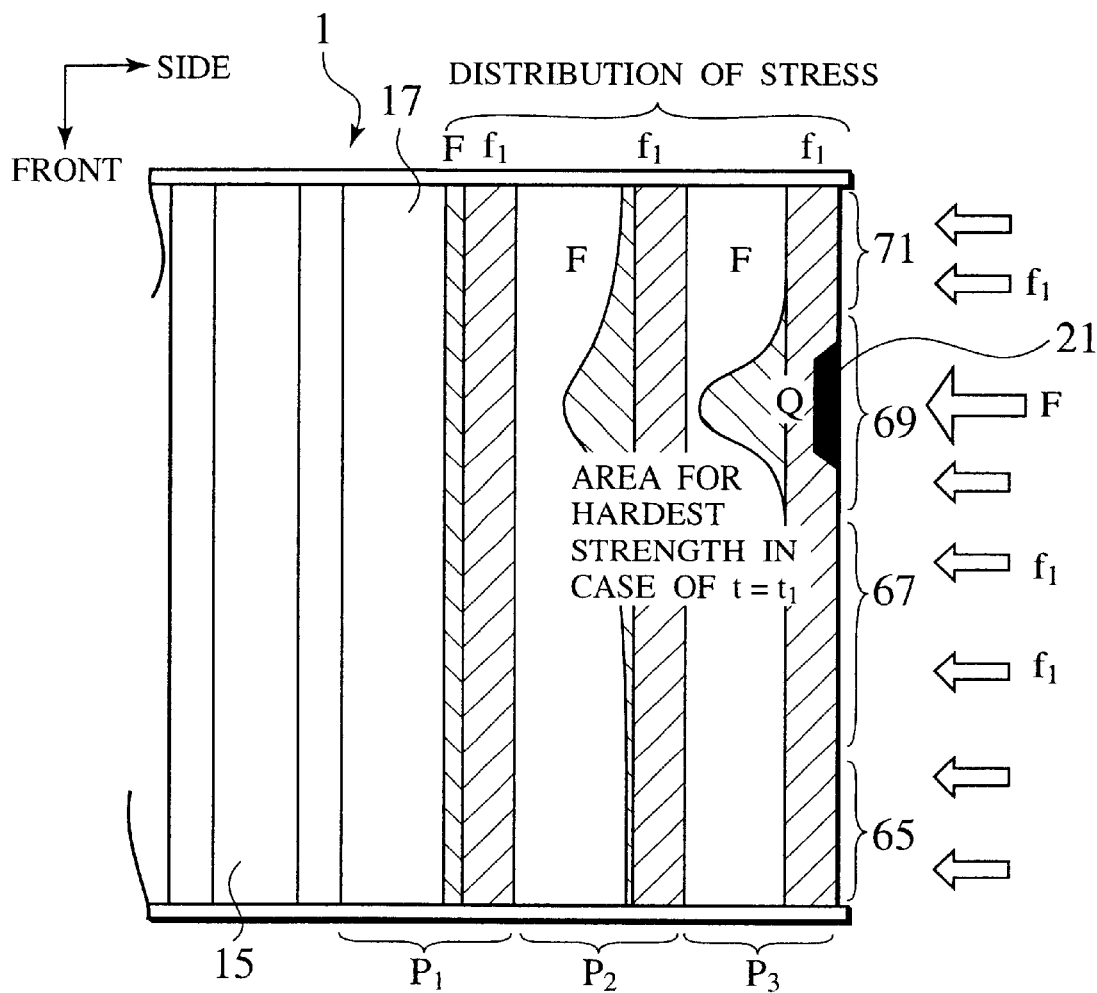
FIG. 22 is a plan view of the essential part of the floor, showing the sequent state at the beginning of the vehicle side collision.

We now describe the load and stress condition in the vehicle side collision with reference to FIGS. 21 and 22. Firstly, in the vehicle side collision ($t=t_0$), the collision force is transmitted to the whole floor section 17 through a not-shown door, the inner part 19 and the outer part 23 of the side sill 5. In this way, a uniform force $f_1$ is applied on the section 17 in the vehicle's fore-and-aft direction. As shown in FIG. 21 with respective areas $P_1$, $P_2$, $P_3$ of slanted lines, the stress distribution is uniform in both vehicle's fore-and-aft direction and vehicle's width direction. Having its front end connected to the dash lower member 11' (FIG. 19) and the rear end connected to the rear floor 6 (FIG. 19), the floor section 17 exhibits a structure similar to so-called "rahmen joint". Consequently, the stress concentration is easy to take place in the longitudinal center P, thereby providing the severest position in view of the strength.

In the embodiment, however, the floor section 17 is formed so as to have the largest thickness in the adjacent-pillar area 67 containing the longitudinal center P, the second largest thickness in the pillar area 69 and relatively smaller thickness in both front area 65 and rear area 71. In other words, it is established that the further it is apart from respective supports at both front and rear ends, the larger strength the floor section at that point does get. Therefore, the characteristic of reactive force property against the load $f_1$ is generally equalized in the vehicle's fore-and-aft direction, thereby causing the stress in the same direction generated in the overall floor section 17 to be averaged. Consequently, it is possible to prevent the .local deformation at the center P, thereby causing a relatively averaged deformation throughout the floor section.

After the vehicle's collision, a force directly acts on the center pillar 21 at the timing of $t = t_1$, when the deformation of a door outer member (not shown) is likely to be completed. Then, the force applied on the center pillar 21 is transmitted to the pillar area 69. Different from the initial load $f_1$, this force is identical to a force F acting in local, as shown in FIG. 22. That is, due to the stress distribution caused by this force F, a point Q in the pillar area 69 is subjected to the severest situation in view of strength; at the time of $t=t_1$. Note that such the stress distribution is gradually averaged as a position in the vehicle's width direction moves from the outermost area $P_3$ to the inner area $P_2$.

If the floor section 17 is shaped to have an uniform strength throughout its section, there is a tendency to increase its sectional coefficient due to the union of the section 17 with the dash lower member 11' and the rear floor 7. It causes the section 27 to be deformed with difficulty. Further, due to such an influence and the coupling to the center pillar 21, there is raised a tendency that the floor section 17 around the center pillar 21 is deformed with difficulty, too. Consequently, with the progress of fracture at the latitudinal center P, the reactive force in appearance would be increased in the neighborhood of the joint to the center pillar 21, thereby increasing the stress in the pillar 21 itself.

On the contrary, as mentioned above, it is established in the embodiment that the adjacent-pillar area 67 containing the center P has the largest thickness in order to enhance its strength and prevent the occurrence of fracture. Furthermore, the pillar area 69 has the second largest thickness to exhibit a strength larger than the same of the front and rear areas 65 and 71. Thus, it facilitates their deformations of these areas 65, 71 exhibiting respective high sectional coefficients due to their welding to the dash lower member 11' and the rear floor 6. Consequently, it is possible to make the stress in the overall floor section 17 uniform in the vehicle's fore-and-aft direction. Thus, since it is restricted to raise the stress generated in the "whole-length" direction of the floor section 17 locally and the deformation is generally averaged in the same direction, it is possibl[0085] to absorb the collision energy efficiently.

Figure 23:
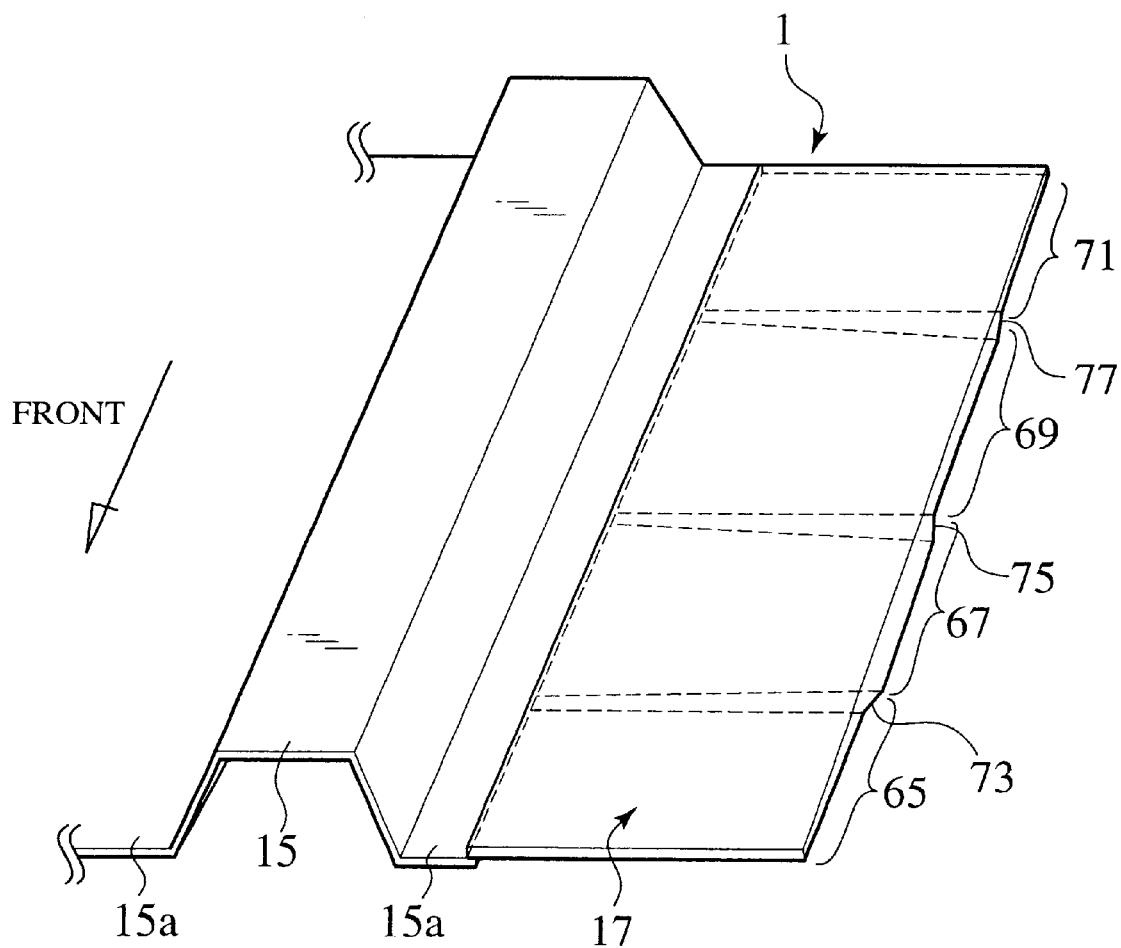
FIG. 23 is a perspective view of the essential part of the vehicle body structure in a modification of the sixth embodiment.

FIG. 23 is a perspective view of the essential part of the floor structure in accordance with a modification of the sixth embodiment. In the modification, the thickness of the floor section 17 is gradually decreased toward the center of the floor structure 1 in the vehicle's width direction. In detail, each of the thick-walled adjacent-pillar area 67 and the thick-walled pillar area 69 is formed to have the largest thickness at each outermost portion in vehicle's width direction and the smallest thickness at each innermost portion joined to a flange 15a of the tunnel section 15. Each of the adjacent-pillar area 67 and the pillar area 69 is formed to have: a thickness at the innermost position, which is equal to each thickness of the front and rear areas 65, 71. That is, the inner end of the floor section 17 in the vehicle's width direction has a constant thickness along the vehicle's fore-and-aft direction.

Also in the above-mentioned structure, it is possible to take the operations and effects similar to those of the structure shown in FIG. 20. Additionally, owing to the formation of the floor section 17 having a gradually decreased thickness toward the latitudinal center, it is possible to provide the floor structure 1 with a further lightweight structure.

Figure 24:
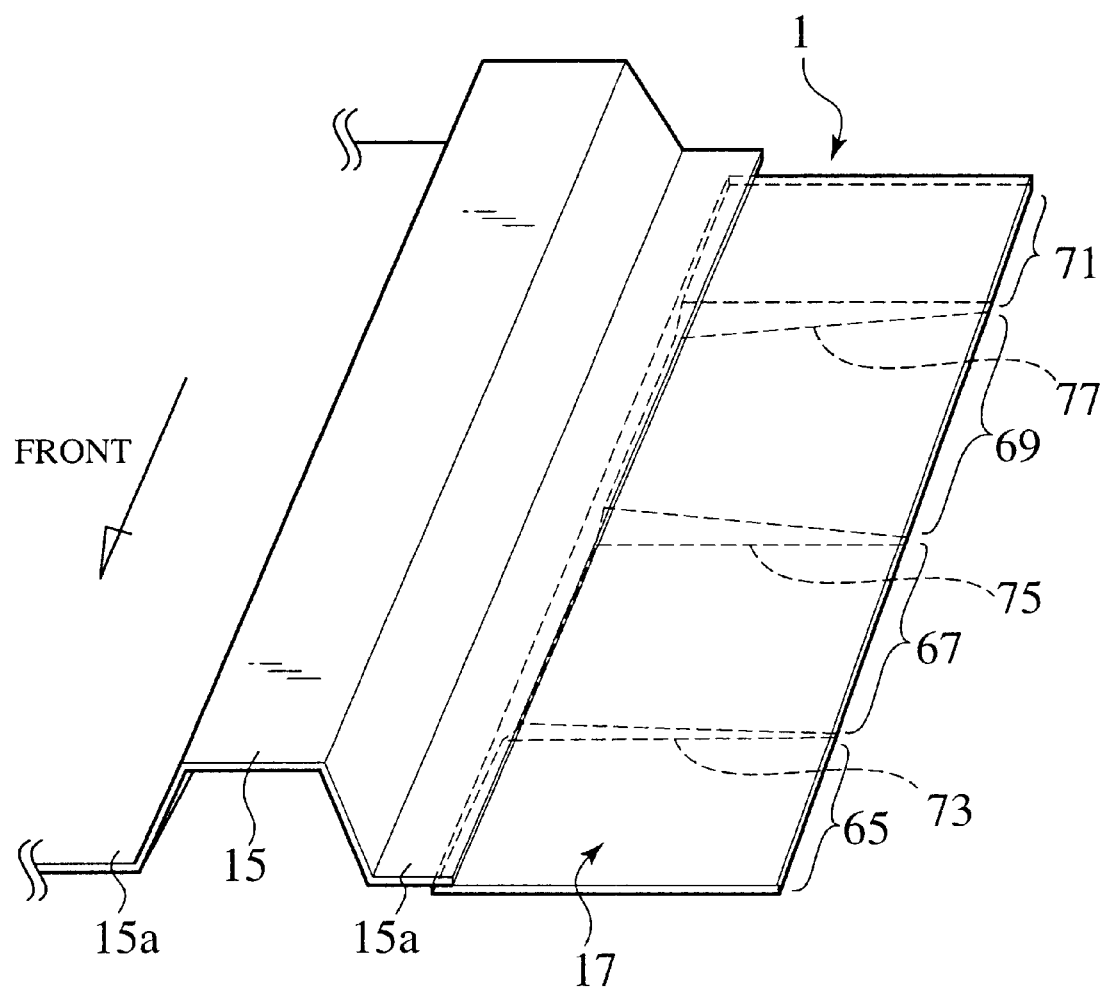
FIG. 24 is a perspective view of the essential part of the vehicle body structure in another modification of the sixth embodiment.

FIG. 24 is a perspective view of the essential part of the floor structure in accordance with another modification of the sixth embodiment. Conversely in the modification, the thickness of the floor section 17 is gradually increased toward the center of the floor structure 1 in the vehicle's width direction. In detail, each of the adjacent-pillar area 67 and the pillar area 69 is formed to have a thickness at the outermost position, which is equal to each thickness of the front and rear areas 65, 71. The outer end of the floor section 17 in the vehicle's width direction has a constant thickness along the vehicle's fore-and-aft direction. Each of the adjacent-pillar area 67 and the pillar area 69 is formed to have the largest thickness at each innermost portion joined to a lower face of the flange 15a of the tunnel section 15. The relationship in thickness among these areas 65, 67, 69 and 71 at their outermost positions is similar to that of the above-mentioned modification, at their innermost positions.

Accordingly, also in this modification, it is possible to take the operations and effects similar to those of the structure shown in FIG. 20. Additionally, owing to the formation of the floor section 17 having a gradually increased thickness toward the latitudinal center, it is possible to provide the floor structure 1 with a further lightweight structure.

Note that, in common with the embodiments of FIGS. 23 and 24, the extruding direction to form the floor section 17 is identical to the vehicle's width direction and therefore, the gradual increase o[00f8] decrease in thickness can be completed by the subsequent machining or the like. In the further modification, it is also possible to construct the floor section 17 by an extrusion obtained by extruding the material in the vehicle fore-and-aft direction and complete the adjustment in thickness by the subsequent machining.

7th. Embodiment

Figure 25:
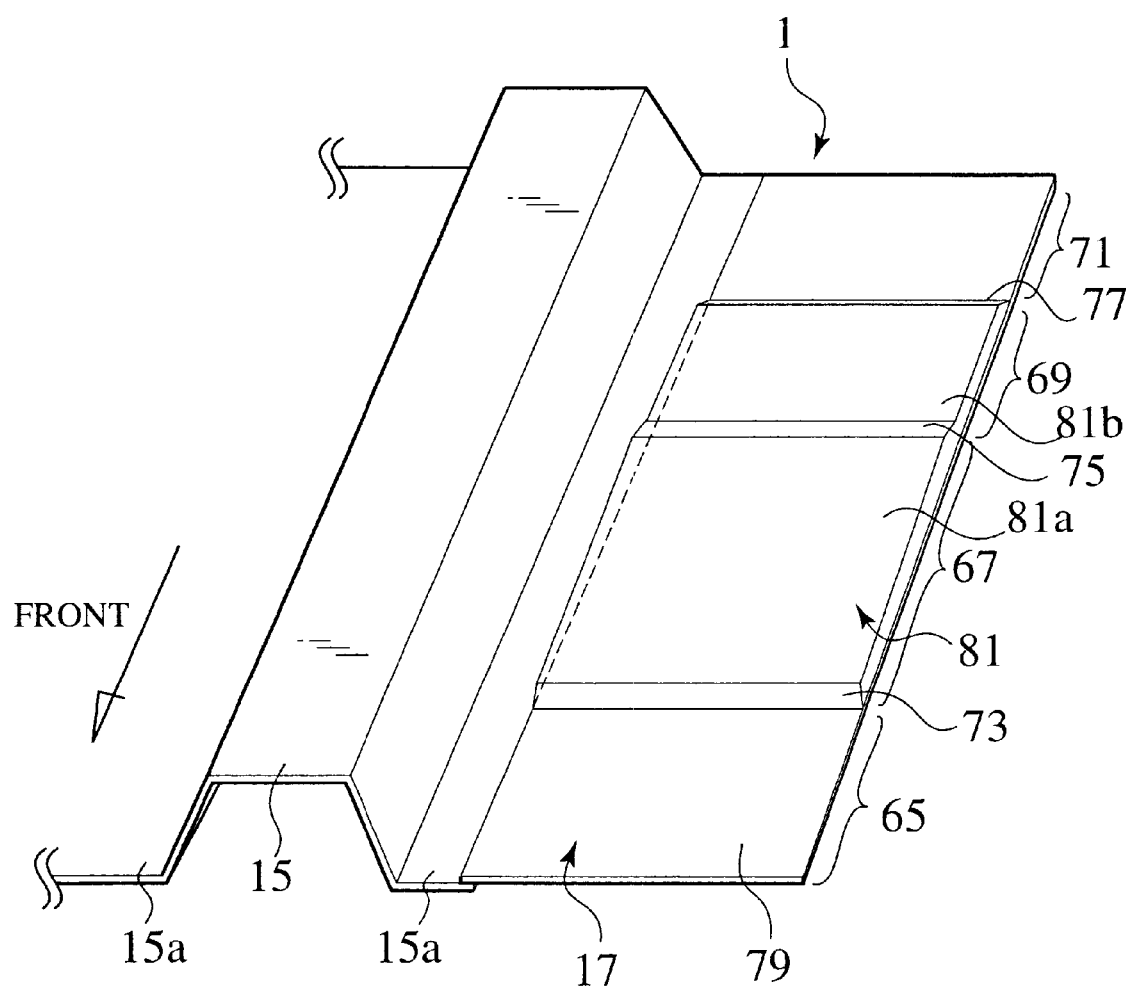
FIG. 25 is a perspective view of the essential part of the vehicle body structure in accordance with the seventh embodiment.

FIG. 25 is a perspective view of the essential part of the body structure in accordance with the seventh embodiment of the invention. In this embodiment, elements corresponding to those of the above embodiment are indicated with the same reference numerals respectively and their overlapping descriptions are eliminated.

According to the embodiment, the floor section 17 includes a uniform thickness plate member 79 and a differential thickness plate member 81. The former member 79 is made from an extrusion of light metals, such as aluminum alloy, manganese alloy, etc., being extruded in the vehicle's fore-and-aft direction or the vehicle's width direction. On the other hand, the latter member 81 has a thick-walled part 81a and a thin-walled part 81b and is made from an extrusion of light metal as well. The extruding direction of the member 81 is identical to the vehicle's width direction. This differential thickness plate member 81 is adhesively fixed to the uniform thickness plate member 79. With the constitution mentioned above, the floor section 17 can be provided with the front area 65, the adjacent-pillar area 67, the pillar area 69 and the rear area 71, which is similar to the constitution of the sixth embodiment.

Accordingly, also in this embodiment, it is possible to accomplish the operations and effects similar to those of the sixth embodiment. Further, owing to the establishment in thickness of the uniform thickness plate member 79 and differential thickness plate member 81, the stress distribution in the vehicle's fore-and-aft direction can be equalized more precisely thereby to absorb the collision energy more certainly and sufficiently.

Figure 26:
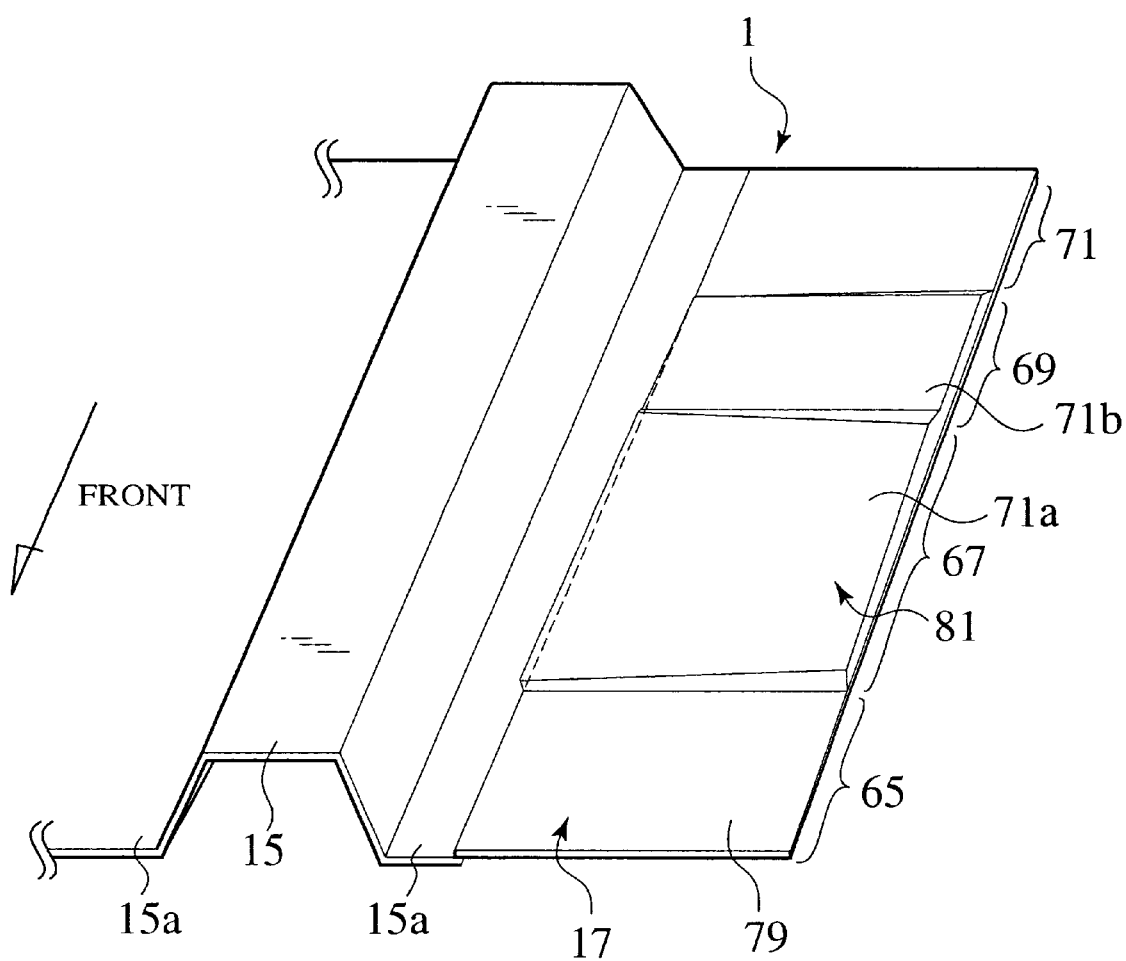
FIG. 26 is a perspective view of the essential part of the vehicle body structure in a modification of the seventh embodiment.

FIG. 26 shows one modification of the seventh embodiment. In this modification, the differential thickness plate member 81 is formed so as to have a thickness gradually decreased from the outer edge of the member 81 toward the center of the floor structure 1 in the vehicle's width direction, i.e., the latitudinal center. In other words, the floor section 17 is generally constructed with a thickness gradually decreased toward the latitudinal center of the floor structure 1. In this way, also in this modification, it is possible to accomplish the operations and effects similar to those of the embodiments of FIGS. 23 and 25.

Figure 27:
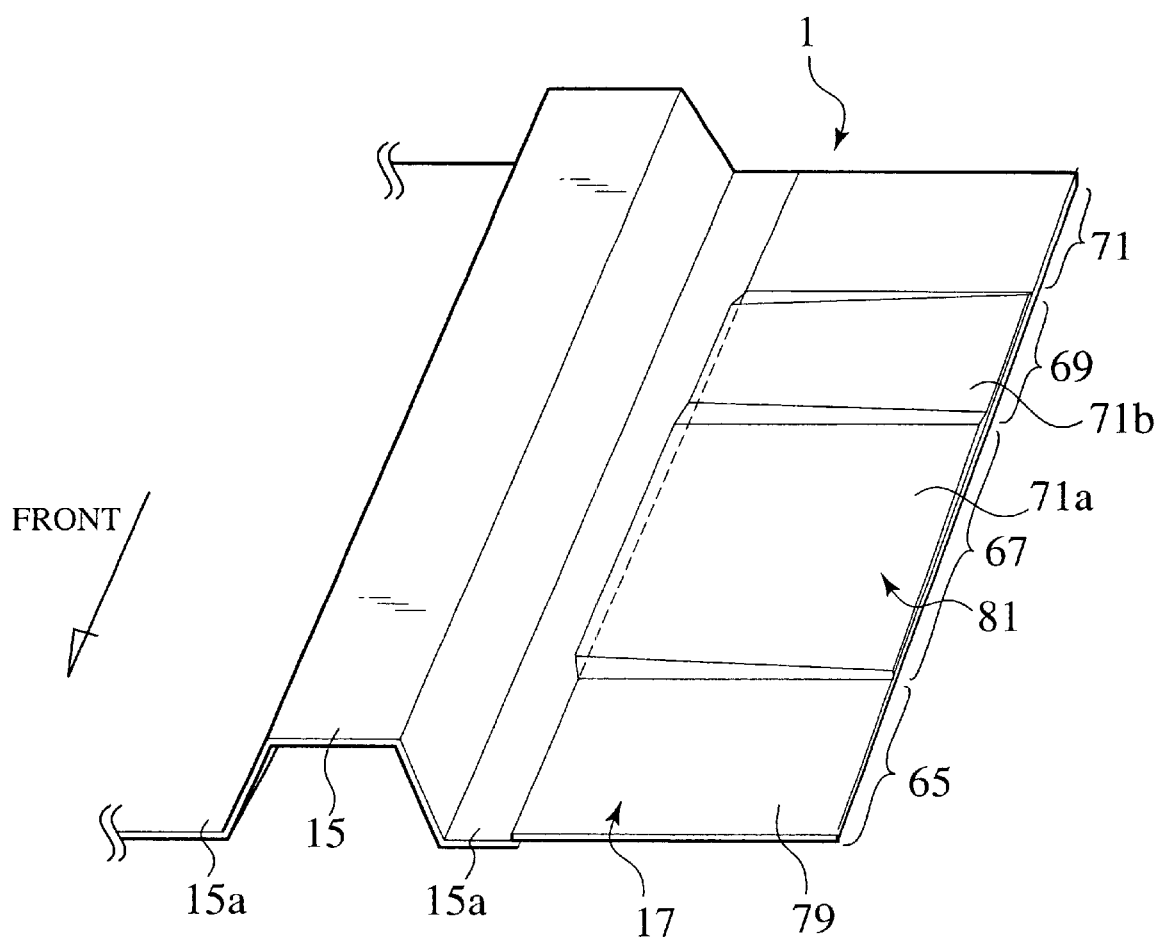
FIG. 27 is a perspective view of the essential part of the vehicle body structure in another modification of the seventh embodiment.

FIG. 27 shows another modification of the seventh embodiment. In this modification, the differential thickness plate member 81 is formed so as to have a thickness gradually increased from the outer edge of the member 81 toward the latitudinal center of the floor structure 1. Thus, the floor section 17 is generally constructed with a thickness gradually increased toward the latitudinal center of the floor structure 1. In this way, also in this modification, it is possible to accomplish the operations and effects similar to those of the embodiments of FIGS. 24 and 25.

$8^{th}$. Embodiment

Figure 28:
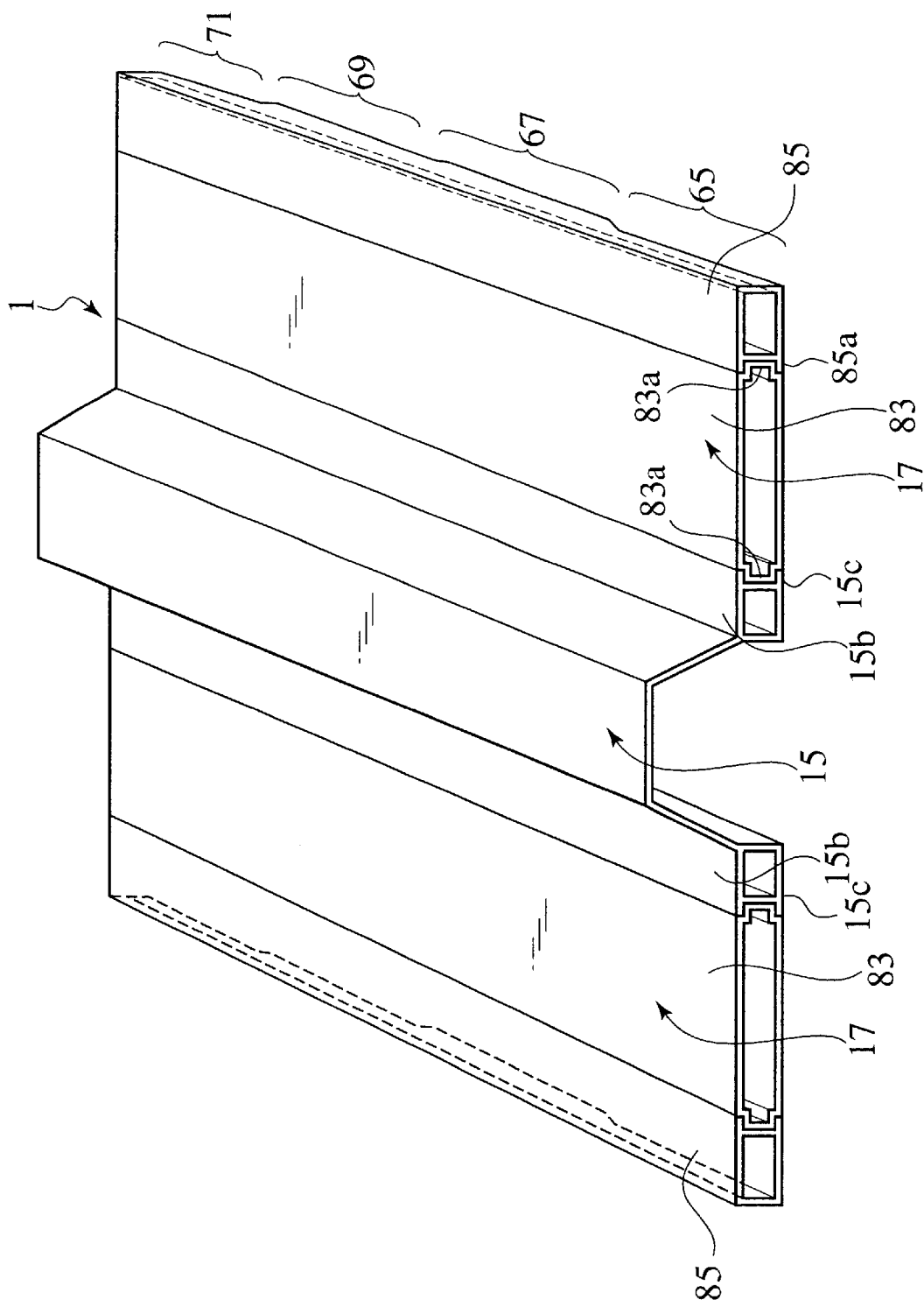
FIG. 28 is a perspective view of the vehicle body structure of the eighth embodiment.

FIG. 28 shows the eighth embodiment of the invention. Note that elements corresponding to those of the above embodiment are indicated with the same reference numerals respectively and their overlapping descriptions are eliminated.

In the embodiment, some extrusions forming the floor section 17 each have a closed sectional structure resulting from extruding the material along the fore-and-aft direction of the vehicle. That is, the tunnel section 15 of the embodiment includes an extrusion made of light metal, such as manganese alloy, having both side portions 15b in the form of closed sections provided with outward-recessed fitting parts 15c, respectively. The floor section 17 is separated into plural components in the vehicle's width direction and comprises relay members 83 and marginal members 85. The relay members 83 and the marginal members 85 are formed by extrusions each made of light metal, for example, manganese alloy, manganese alloy, etc.

Each relay member 83 is provided, on both latitudinal sides thereof (i.e. width directional side), with projecting fitting parts 83a in pairs. The inner projecting fitting parts 83a of each relay member 83 is engaged in the fitting part 15c of the tunnel section 15 and fixed thereto by mean of laser welding or the like.

Each marginal member 85 is provided, on a latitudinal inside thereof, with a recessed fitting part 85a for engagement with the projecting fitting part 83a of the relay member 83 by means of laser welding etc. The underside of the marginal member 85 is step-shaped to have plural thickness. As similar to the above-mentioned embodiment, the adjacent-pillar area 67 has the maximum thickness, the pillar area 69 has a thickness next to the area 67 and the front and rear areas 65 and 71 have the smallest thickness, respectively. Such an adjustment in thickness can be accomplished by machining after extruding the material into marginal member 85. In the shown embodiment, the thick-walled adjacent-pillar area 67 and the thick-walled pillar area 69 are together formed to have constant thickness in the vehicle's width direction. In the modification, as shown in FIGS. 23 and 24, these thicknesses may be gradually decreased or increased toward the latitudinal center of the floor structure 1. Alternatively, upon extruding the material into the marginal member 85 having a thin-walled regular section, different-thickness members may be glued to the thick-walled adjacent-pillar area 67 and the thick-walled pillar area 69, thereby attaining the structures shown in FIG. 25 to 27.

Accordingly, also in this embodiment, it is possible to accomplish the operations and effects similar to those of the sixth embodiment. Further, owing to the closed sectional structure, it is possible to enhance the strength of the floor section 17 and progress the energy absorption due to the uniform buckling of the floor section 17 in the vehicle's width direction.

Note that the floor section 17 may be formed into one body as an extrusion without being separated in the vehicle's width direction.

Alternatively, the floor section 17 and the tunnel section 15 may be formed into one body as an extrusion.

9th. Embodiment

Figure 29:
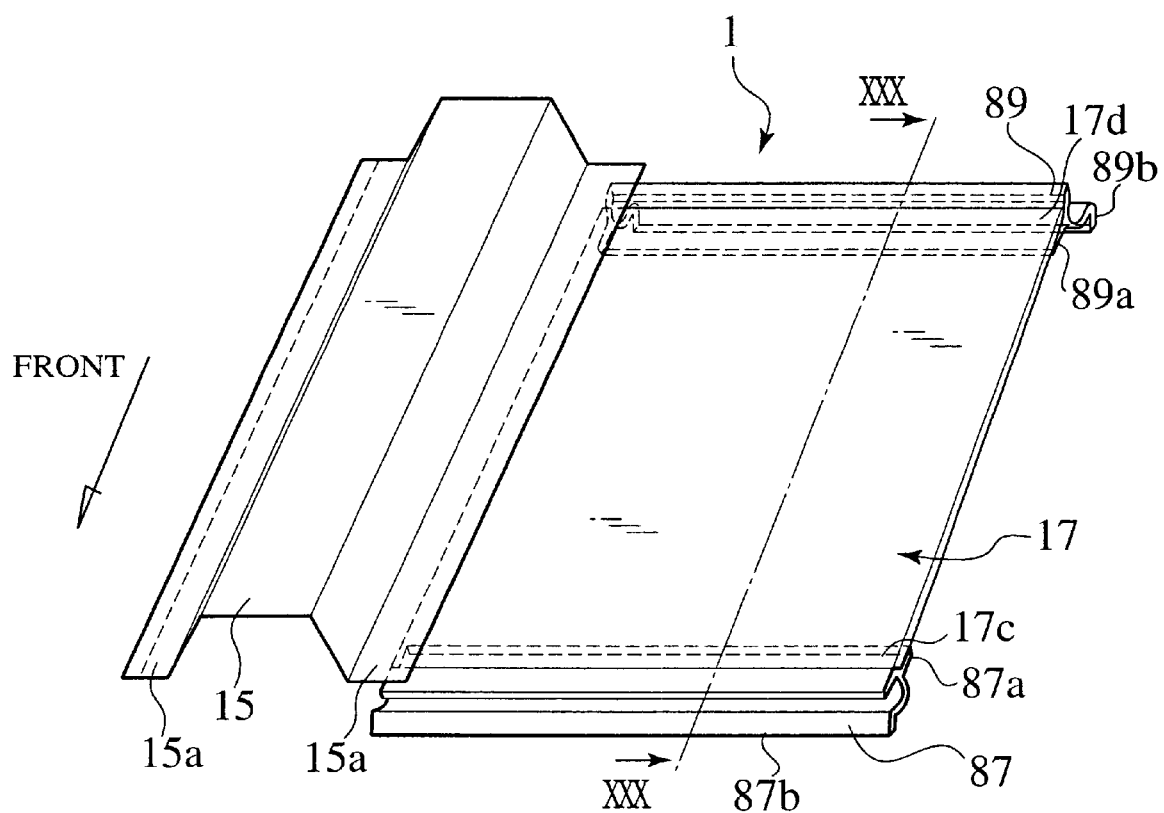
FIG. 29 is a perspective view of the essential part of the vehicle body structure in accordance with the ninth embodiment.
Figure 30:
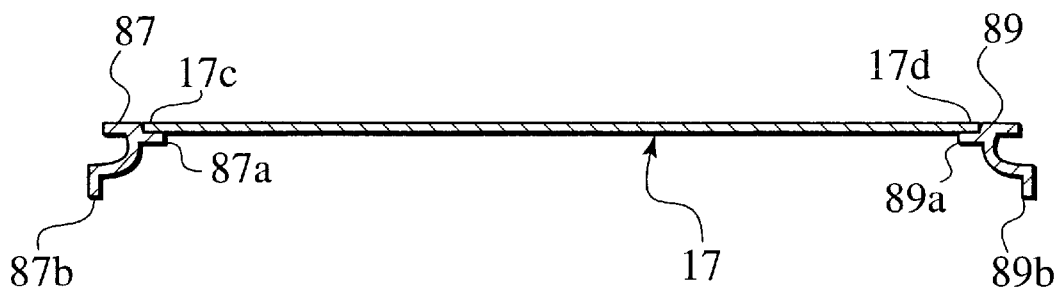
FIG. 30 is a sectional view taken along a line XXX—XXX of FIG. 29.

FIGS. 29 and 30 show the ninth embodiment of the invention. In these figures, FIG. 29 is a perspective view of the essential part of the vehicle body structure of the embodiment and FIG. 30 is a sectional view taken along a line XXX—XXX of FIG. 29. In the shown vehicle body structure, elements corresponding to those of the above embodiment are indicated with the same reference numerals respectively and their overlapping descriptions are eliminated.

In the embodiment, the floor section 17 is constructed by an extrusion having its front edge connected to the dash lower member 11' (FIG. 19) through a joint member 87 and the rear edge connected to the rear floor (FIG. 19) through another joint member 89.

That is, the floor section 17 is composed of the extrusion of light metal (e.g. aluminum alloy, manganese alloy) having a uniform thickness. The extruding direction of the section 17 is identical to either vehicle's fore-and-aft direction or vehicle's width direction. The joint members 87, 89 are provided with flanges 87a, 89a, respectively. In assembly, the floor section 17 has front and rear edges 17c, 17d mounted and secured on these flanges 87a, 89a of the members 87, 89 respectively, by means of laser welding etc. Furthermore, the joint member 87 has a downward directional flange 87b connected with the dash lower member 11' (FIG. 19) by welds, bolts or the like. Similarly, the joint member 89 has a downward directional flange 89b connected with the rear floor 6 (FIG. 19) by welds, bolts or the like.

Although the floor section 17 is not formed with a differential thickness in this embodiment, the front and rear edges 17c, 17d of the floor section 17 are welded to the flanges 87a, 89a of the joint members 87, 89 so that the resultant welding strengths are respectively larger than the strength of the center pillar and smaller than the strengths of the portions in front and behind the center pillar. With the establishment of the strength, at the vehicle side collision, the front and rear edges 17c, 17d of the floor section 17 can be easily deformed at the flanges 87a, 89a in comparison with the dash lower member 11 and the rear floor 6. Thus, by releasing the moment acting on the floor to some degree, it is possible to restrict the stress concentration on the longitudinal center of the floor section 17, thereby restricting the local deformation. Consequently, the stress in the floor section 23 is generally equalized in the vehicle's fore-and-aft direction, whereby it is possible to increase the energy absorption with generally uniform deformation.

Figure 31:
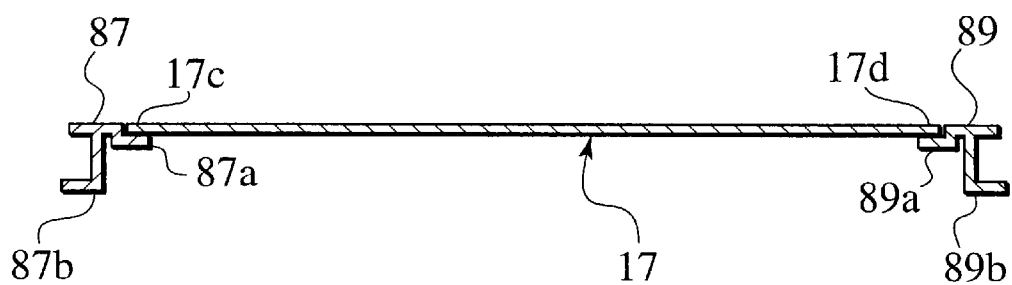
FIG. 31 is a sectional view of the vehicle body in a modification of the ninth embodiment.

FIG. 31 shows a cross section of the floor section in one modification of the ninth embodiment. In FIG. 31, the flanges 87b, 89b for connection with the dash lower member and the rear floor (not shown) are formed so as to direct horizontally. Also in the modification, the front and rear edges 17c, 17d of the floor section 17 are joined to the flanges 87b, 89b by welding etc. Therefore, it is possible to facilitate the displacement of the front and rear edges 17c, 17d against the flanges 87b, 89b at the vehicle's flank collision, thereby taking the operations and effects similar to those of the embodiment of FIGS. 29 and 30.

The entire contents of Japanese Patent Application No. 11-249199 (filed on Sep. 2, 1999) and Japanese Patent Application No. 11-275170 (filed on Sep. 28, 1999) are incorporated herein by reference.

The scope of the invention is defined with reference to the following claims.

What is claimed is:

1. A vehicle body structure for a vehicle, comprising:

an extruded floor structure having a floor body formed with generally uniform sections and being extruded, in a longitudinal direction of a vehicle, a dash cross member connected to a front end of the floor body to form a framework member of the floor structure, and a rear cross member connected to a rear end of the floor body to form another frame work member of the floor structure, and a rear cross member connected to a rear end of the floor body to form another framework member of the floor structure;

a side sill arranged on one side of the floor structure;

a pillar having its lower end connected to the side sill at a point offset rearward of a longitudinal center of the floor structure; and a strength adjusting part provided with at least one of the side of the floor body and the side sill;

wherein said strength adjusting part serves to relatively reduce a reactive force against a collision input, which force would be generated on the side of the lower end of the pillar during a vehicle side collision, in comparison with a reactive force generated on the side of the longitudinal center of the floor body under the same situation.

2. The vehicle body structure of claim 1, wherein the strength adjusting part is formed so as to reduce a strength of the lower end of the pillar in comparison with a strength of the center part of the floor body in the vehicle's fore-and-aft direction.

3. The vehicle body structure of claim 1, wherein the strength adjusting part is formed so as to increase a strength of the center part of the floor body in the vehicle's fore-and-aft direction in comparison with a strength of the lower end of the pillar.

4. The vehicle body structure of a claim 1, wherein the floor body is formed by a light metal member extruded in the fore-and-aft direction.

5. The vehicle body structure of claim 4, wherein the side sill has an inner part formed integrally with the side part of the floor body; and an outer part of the side sill and the pillar are together made from a casting of light metal.

6. The vehicle body structure of claim 1, wherein the side sill is made from a casting of light metal so as to have a thickened part therein, providing the strength adjusting part.

* * * * *